United States Patent [19]

Fukada et al.

[11] Patent Number: 5,627,756

[45] Date of Patent: May 6, 1997

[54] DEVICE FOR CONTROLLING TURN BEHAVIOR OF VEHICLE

[75] Inventors: Yoshiki Fukada; Shoji Inagaki, both of Susono, Japan

[73] Assignee: Toyota Jidosha Kabushiki Kaisha, Aichi-ken, Japan

[21] Appl. No.: 459,968

[22] Filed: Jun. 2, 1995

[30] Foreign Application Priority Data

Jul. 28, 1994 [JP] Japan ................... 6-195912

[51] Int. Cl.$^6$ ................... B60K 28/16
[52] U.S. Cl. ................... 364/426.01; 180/197
[58] Field of Search .............. 364/426.03, 426.01, 364/426.02, 426.04, 426.05; 180/197, 282

[56] References Cited

U.S. PATENT DOCUMENTS

| | | | |
|---|---|---|---|
| 4,412,594 | 11/1983 | Furukawa et al. | 180/140 |
| 4,669,745 | 6/1987 | Miki et al. | 280/91 |
| 4,809,181 | 2/1989 | Ito et al. | 364/426.01 |
| 4,898,431 | 2/1990 | Karnopp et al. | 180/140 |
| 4,967,865 | 11/1990 | Schindler | 180/79.1 |
| 4,998,593 | 3/1991 | Karnopp et al. | 303/100 |
| 5,123,497 | 6/1992 | Yopp et al. | 180/142 |
| 5,255,194 | 10/1993 | Schaufelberger et al. | 364/426.02 |
| 5,309,362 | 5/1994 | Ito et al. | 364/426.03 |
| 5,370,199 | 12/1994 | Akuta et al. | 180/197 |

FOREIGN PATENT DOCUMENTS

| | | |
|---|---|---|
| 0150856 | 8/1985 | European Pat. Off. |
| 0338506 | 10/1989 | European Pat. Off. |
| 0443520 | 8/1991 | European Pat. Off. |
| 0559114 | 9/1993 | European Pat. Off. |
| 4114165 | 11/1991 | Germany |
| 4-325357 | 11/1992 | Japan |
| 5-278624 | 10/1993 | Japan |
| 2257551 | 1/1993 | United Kingdom |
| 2259892 | 3/1993 | United Kingdom |
| 2266957 | 11/1993 | United Kingdom |

OTHER PUBLICATIONS

Ackermann, "Robust Car Steering by Yaw Rate Control", Decision and Control, 1990 29th Annual Conference, 1990 pp. 2033–2034.

Primary Examiner—Kevin J. Teska
Assistant Examiner—Stephen J. Walder, Jr.
Attorney, Agent, or Firm—Oliff & Berridge

[57] ABSTRACT

To control turn behavior of a vehicle such as an automobile more effectively and desirably by presuming the turn behaving of the vehicle at higher precision, a turn behavior control device detects lateral acceleration Gy of a vehicle body, vehicle speed V and yaw rate r of the vehicle body, then calculates lateral slide velocity Vy of the vehicle by integrating deviation Gy-Vr according to a predetermined integration time constant, then presumes the turn behavior of the vehicle based upon at least the lateral slide velocity Vy, and then controls the turn behavior of the vehicle based upon the presumed turn behavior. When the turn behavior of the vehicle is presumed to be stable, the integration time constant is made small to decrease accumulation of errors, whereas when the turn behavior of the vehicle is presumed to be unstable, the integration time constant is made large so as to definitely execute the behavior control.

15 Claims, 23 Drawing Sheets

DEVICE FOR CONTROLLING TURN BEHAVIOR OF VEHICLE

BACKGROUND OF THE INVENTION

1. Field of the Invention

The present invention relates to a device for controlling turn behavior of a vehicle so as to suppress and reduce undesirable behavior such as drift out or spin which can occur during turn of a vehicle such as an automobile.

2. Description of the Prior Art

As one of the devices for controlling behavior of a vehicle such as an automobile during turn of the vehicle, there is known an art such as described, for example, in Japanese Patent Laid-open Publication 5-278624, which comprises means for obtaining rate of change of yaw rate of the vehicle body, means for obtaining slip angle of the vehicle body, means for presuming turn behavior of the vehicle based upon the rate of change of the yaw rate and the slip angle, and means for controlling turn behavior of the vehicle based upon the presumed turn behavior to stabilize the turn behavior.

By such a behavior control device, as compared with an art presuming turn behavior of a vehicle based upon lateral acceleration of a vehicle body liable to be affected by the friction coefficient of road surface, it is possible to presume turn behavior of the vehicle at high precision, regardless of the friction coefficient of road surface, so that the turn behavior of the vehicle during a turn is controlled more desirably.

In the behavior control device described in the above-mentioned patent laid-open publication, the control of turn behavior of a vehicle is based upon the detection of lateral acceleration of a vehicle body, vehicle speed, and yaw rate of the vehicle body. However, since the control based upon the lateral acceleration and the yaw rate incorporates therein an integration procedure, errors in the detection of those parameters are accumulated, and therefore, the accuracy of the control is often damaged by the accumulation of those detection errors. Further, as the optimum points of standard values for comparison often shift during the judgement of the turn behavior due to changes of running conditions of the vehicle, the accuracy of the behavior control is also thereby damaged. Particularly when a spin of the vehicle is presumed in the control of the turn behavior of a vehicle such that braking forces applied to vehicle wheels are controlled based upon a presumed spin condition of the vehicle, if the judgment of the spin is not accurate, it can occur that the spin is augmented. However, if a non-sensitive area against errors is increased to accommodate such detection errors, the control of turn behavior of a vehicle will not be accomplished in a stable manner.

SUMMARY OF THE INVENTION

In view of the above-mentioned problems of the conventional behavior control devices for vehicles, it is a primary object of the present invention to provide an improved turn behavior control device of a vehicle such as an automobile which can precisely execute a necessary behavior control, while avoiding unnecessary behavior control operations, based upon a presumption of the turn behavior of the vehicle at higher precision, so that a more desirable and effective turn behavior control of a vehicle is provided.

In order to accomplish the above-mentioned object, the present invention proposes a device for controlling turn behavior of a vehicle such as an automobile, comprising:

(1) means for detecting lateral acceleration Gy of a vehicle body, means for detecting vehicle speed V, means for detecting yaw rate r of the vehicle body, means for presuming turn behavior of the vehicle based upon at least lateral slide velocity Vy of the vehicle by obtaining the lateral slide velocity Vy through integration of deviation Gy-Vr with a predetermined integration time constant, and means for controlling turn behavior of the vehicle based upon the presumed turn behavior, wherein said turn behavior presuming means includes means for varying said integration time constant such that said integration time constant is set to be smaller when a stable turn behavior of the vehicle is presumed than when an unstable turn behavior of the vehicle is presumed (construction 1);

(2) means for detecting lateral acceleration Gy of a vehicle body, means for detecting vehicle speed V, means for detecting yaw rate r of the vehicle body, means for presuming turn behavior of the vehicle based upon at least lateral slide velocity Vy of the vehicle by obtaining the lateral slide velocity Vy through integration of deviation Gy-Vr, and means for controlling turn behavior of the vehicle based upon the presumed turn behavior, wherein said turn behavior presuming means includes means for modifying the lateral slide velocity Vy such that the lateral slide velocity Vy is decreased when the direction of the lateral slide velocity Vy is in contradiction to the direction of other parameter of the vehicle from the view point of dynamics (construction 2);

(3) means for detecting lateral acceleration Gy of a vehicle body, means for presuming turn behavior of the vehicle based upon at least the lateral acceleration Gy, and means for controlling turn behavior of the vehicle based upon the presumed turn behavior of the vehicle, wherein said turn behavior presuming means comprises means for detecting vehicle speed V, means for detecting yaw rate r of the vehicle body, means for calculating deviation Gy-Vr, means for calculating cant compensation quantity through low pass filtering of the deviation Gy-Vr, and means for modifying the lateral acceleration Gy according to the cant compensation quantity, the turn behavior of the vehicles being presumed based upon the modified lateral acceleration Gya (construction 3);

(4) means for detecting lateral acceleration Gy of a vehicle body, means for presuming turn behavior of the vehicle based upon at least the lateral acceleration Gy, and means for controlling turn behavior of the vehicle based upon the presumed turn behavior of the vehicle, wherein said turn behavior presuming means comprises means for detecting vehicle speed V, means for detecting yaw rate r of the vehicle body, means for calculating deviation Gy-Vr, means for calculating cant compensation quantity through low pass filtering of the deviation Gy-Vr, and means for modifying the lateral acceleration Gy according to the cant compensation quantity, the turn behavior of the vehicle being presumed based upon the modified lateral acceleration Gya, said behavior presuming means comprising means for calculating lateral slide velocity Vy of the vehicle through integration of deviation Gya-Vr between the modified lateral acceleration Gya and Vr, means for presuming spin of the vehicle based upon the lateral slide velocity Vy, and means for modifying the cant compensation quantity to zero when the compensation by the cant compensation quantity increases the lateral slide velocity Vy in a condition that a spin of the vehicle is presumed (construction 4);

(5) means for detecting lateral acceleration Gy of a vehicle body, means for detecting vehicle speed V, means for detecting yaw rate r of the vehicle body, means for presuming turn behavior of the vehicle based upon at least lateral slide velocity Vy by obtaining the lateral slide velocity Vy through integration of deviation Gy-Vr, and means for controlling turn behavior of the vehicle based upon the presumed turn behavior, wherein said turn behavior presuming means includes means for modifying the lateral acceleration Gy such that change rate thereof is decreased in obtaining the lateral slide velocity Vy when the absolute value of Gy is decreasing under a condition that the absolute value of the Gy is smaller than the absolute value of Vr (construction 5);

(6) means for detecting lateral acceleration Gy of a vehicle body, means for presuming turn behavior of the vehicle based upon at least the lateral acceleration Gy, and means for controlling turn behavior of the vehicle based upon the presumed turn behavior, wherein said turn behavior presuming means comprises means for obtaining radius of curvature of road, means for presuming bank angle of road surface based upon the radius of curvature, and means for modifying the lateral acceleration Gy according to the presumed bank angle, the turn behavior of the vehicle being presumed based upon the modified lateral acceleration (construction 6);

(7) means for detecting lateral acceleration Gy of a vehicle body, means for detecting vehicle speed V, means for detecting yaw rate r of the vehicle body, means for detecting steering angle θ, means for calculating a first estimation quantity expressing lateral sliding of the vehicle based upon the lateral acceleration Gy, the vehicle speed V and the detected yaw rate r, means for calculating a second estimation quantity expressing deviation Δr between target yaw rate obtained from the steering angle θ and the vehicle speed V and the detected yaw rate, means for presuming turn behavior of the vehicle based upon at least said first and second estimation quantities each weighed by individual weighing factor, and means for controlling turn behavior of the vehicle based upon the presumed turn behavior, wherein said turn behavior presuming means includes means for modifying said weighing factor such that said second estimation quantity is more weighed when a stable turn behavior of the vehicle is presumed, while said first estimation quantity is more weighed when an unstable turn behavior of the vehicle is presumed (construction 7);

(8) means for detecting lateral acceleration Gy of a vehicle body, means for detecting vehicle speed V, means for detecting actual yaw rate r of the vehicle body, means for detecting steering angle θ, means for calculating a first estimation quantity expressing lateral sliding of the vehicle based upon the lateral acceleration Gr, the vehicle speed V and the detected yaw rate r, means for calculating a second estimation quantity expressing deviation Δr between target yaw rate obtained from the steering angle θ and the vehicle speed V and the detected actual yaw rate, means for presuming spin of the vehicle based upon at least said first and second estimation quantities, and means for controlling the turn behavior of the vehicle so as to decrease the spin based upon presumed spin, wherein said means for calculating said second estimation quantity is adapted to calculate target yaw rate with a predetermined cycle and to calculate said second estimation quantity by replacing the current target yaw rate by the target yaw rate at a preceding cycle when the steering angle θ is changing toward further steering in a condition that a spin of the vehicle is presumed by the turn behavior presuming means (construction 8);

(9) means for detecting lateral acceleration Gy of a vehicle body, means for detecting vehicle speed V, means for detecting actual yaw rate r of the vehicle body, means for detecting steering angle θ, means for calculating a first estimation quantity expressing lateral sliding of the vehicle based upon the lateral acceleration Gy, the vehicle speed V and the detected actual yaw rate r, means for calculating a second estimation quantity expressing deviation Δr between target yaw rate obtained from the steering angle θ and the vehicle speed V and the actual yaw rate, means for presuming spin of the vehicle based upon at least said first and second estimation quantities, and means for controlling turn behavior of the vehicle so as to decrease the spin based upon the presumed spin, wherein said turn behavior presuming-means includes means for limiting said second estimation quantity not to be greater than a predetermined value when the detected actual yaw rate is smaller than the target yaw rate (construction

(10) means for detecting lateral acceleration Gy of a vehicle body, means for detecting vehicle speed V, means for detecting actual yaw rate r of the vehicle body, means for detecting steering angle θ, means for calculating a first estimation quantity expressing lateral sliding of the vehicle based upon the lateral acceleration Gy, the vehicle speed V and the detected actual yaw rate r, means for calculating a second estimation quantity expressing deviation Δr between target yaw rate obtained from the steering angle θ and the vehicle speed V and the detected actual yaw rate, means for presuming spin of the vehicle based upon at least said first and second estimation quantities, and means for controlling spin behavior of the vehicle so as to decrease the spin based upon the presumed spin, wherein said means for calculating said second estimation quantity comprises means for processing the target yaw rate obtained from the steering angle θ and the vehicle speed V to incorporate a primary delay, and means for modifying time constant of the primary delay such that the time constant is set smaller when the target yaw rate after the primary delay processing is not between the target yaw rate before the primary delay processing and the detected actual yaw rate than when the target yaw rate after the primary delay processing is between the target yaw rate before the primary delay processing and the detected actual yaw rate (construction 10);

(11) means for detecting lateral acceleration Gy, means for detecting vehicle speed V, means for detecting actual yaw rate r of the vehicle body, means for detecting steering angle θ, means for calculating a first estimation quantity expressing lateral sliding of the vehicle based upon the lateral acceleration Gy, the vehicle speed V and the detected actual yaw rate r, means for calculating a second estimation quantity expressing deviation Δr between target yaw rate obtained from the steering angle θ and the vehicle speed V and the detected actual yaw rate, means for presuming turn behavior of the vehicle based upon a final estimation quantity based upon at least said first and second estimation quantities, and means for controlling turn behavior of the vehicle according to a control amount depending upon said final estimation quantity based upon the presumed turn behavior of the vehicle, further comprising means for detecting wheel speeds of left and right front vehicle wheels, means for detecting actual longitudinal acceleration Gx of the vehicle, means for calculating presumed yaw rate rhat of the vehicle body based upon the wheel speeds of the left and right front vehicle wheels, means for calculating presumed longitudinal acceleration Gxhat based upon the wheel speeds of the left and right front vehicle wheels, means for presuming level of road disturbance based upon the deviation between the detected actual yaw rate r and the presumed yaw rate rhat and the deviation between the actual longitudinal acceleration Gx and the presumed longitudinal acceleration Gxhat, and means for modifying said control amount according to the level of road disturbance (construction 11);

(12) means for detecting lateral acceleration Gy, means for detecting vehicle speed V, means for detecting actual yaw rate r of the vehicle body, means for detecting steering angle θ, means for calculating a first estimation quantity expressing lateral sliding of the vehicle based upon the lateral acceleration Gy, the vehicle speed V and the detected actual yaw rate r, means for calculating a second estimation quantity expressing deviation Δr between target yaw rate obtained from the steering angle θ and the vehicle speed V and the detected actual yaw rate, means for presuming turn behavior of the vehicle based upon a final estimation quantity based upon at least said first and second estimation quantities, and means for controlling turn behavior of the vehicle according to a control amount depending upon said final estimation quantity based upon the presumed turn behavior of the vehicle, further comprising means for detecting wheel speeds of left and right front vehicle wheels, means for detecting actual longitudinal acceleration Gx of the vehicle, means for calculating presumed yaw rate rhat of the vehicle body based upon the wheel speeds of the left and right front vehicle wheels, means for calculating presumed longitudinal acceleration Gxhat based upon the wheel speeds of the left and right front vehicle wheels, means for presuming level of road disturbance based upon the deviation between the detected actual yaw rate r and the presumed yaw rate rhat and the deviation between the actual longitudinal acceleration Gx and the presumed longitudinal acceleration Gxhat, and means for modifying said control amount according to the level of road disturbance, said control amount modifying means being adapted to modify said control amount by modifying said final estimation quantity according to the level of road disturbance (construction 12);

(13) means for detecting lateral acceleration Gy, means for detecting vehicle speed V, means for detecting actual yaw rate r of the vehicle body, means for detecting steering angle θ, means for calculating a first estimation quantity expressing lateral sliding of the vehicle based upon the lateral acceleration Gy, the vehicle speed V and the detected actual yaw rate r, means for calculating a second estimation quantity expressing deviation Δr between target yaw rate obtained from the steering angle θ and the vehicle speed V and the detected actual yaw rate, means for presuming turn behavior of the vehicle based upon a final estimation quantity based upon at least said first and second estimation quantities, and means for controlling turn behavior of the vehicle according to a control amount depending upon said final estimation quantity based upon the presumed turn behavior of the vehicle, further comprising means for detecting wheel speeds of left and right front vehicle wheels, means for detecting actual longitudinal acceleration Gx of the vehicle, means for calculating presumed yaw rate rhat of the vehicle body based upon the wheel speeds of the left and right front vehicle wheels, means for calculating presumed longitudinal acceleration Gxhat based upon the wheel speeds of the left and right front vehicle wheels, means for presuming level of road disturbance based upon the deviation between the detected actual yaw rate r and the presumed yaw rate rhat and the deviation between the actual longitudinal acceleration Gx and the presumed longitudinal acceleration Gxhat, and means for modifying said control amount according to the level of road disturbance, said turn behavior control means being adapted to control the turn behavior of the vehicle according to said control amount based upon said final estimation quantity when said final estimation quantity exceeds a threshold value, and said control amount modifying means is adapted to modify said control amount by modifying said threshold value according to the level of road surface disturbance (construction 13);

(14) means for detecting lateral acceleration Gy, means for detecting actual yaw rate r of the vehicle body, means for calculating an estimation quantity expressing lateral sliding of the vehicle based upon the lateral acceleration Gy and the detected actual yaw rate r, means for presuming spin of the vehicle body based upon at least said estimation quantity, and means for controlling spin of the vehicle so as to decrease the spin based upon the presumed spin, further comprising means for detecting vehicle speed V, means for detecting steering angle θ, means for calculating target yaw rate rt from the steering angle θ and the vehicle speed V, means for calculating target lateral acceleration Gyt from the steering angle θ and the vehicle speed V, means for judging if the deviation between the target yaw rate rt and the detected actual yaw rate r or the deviation between the target lateral acceleration Gyt and the lateral acceleration Gy is not greater than a predetermined threshold value, and means for prohibiting the behavior control by said behavior control means when said deviation with respect to yaw rate or said deviation with respect to lateral acceleration is not greater than said threshold value (construction 14); or

(15) means for detecting lateral acceleration Gy, means for detecting actual yaw rate r of the vehicle body, means for calculating an estimation quantity expressing lateral sliding of the vehicle based upon the lateral acceleration Gy and the detected actual yaw rate r, means for presuming spin of the vehicle based upon at least said estimation quantity, and means for controlling spin of the vehicle so as to decrease the spin based upon the presumed spin, further comprising means for judging a first condition that the vehicle is braked during turn, means for judging a second condition that the vehicle is accelerated in an under-steer condition, and means for expediting the behavior control by the behavior control means when said first condition or said second condition is detected (construction 15).

As will be appreciated from the above-mentioned constructions and the detailed descriptions thereof made hereinbelow, it is other objects of the present invention to provide an improved turn behavior control device which accomplishes the above-mentioned primary object in effective and desirable constructions.

As is well known in the art, when a vehicle turns, a lateral acceleration expressed by Gy hereinbelow acts to the vehicle as a centripetal acceleration, which can be presumed as a product Vr of vehicle speed V and yaw rate r of the vehicle body. If the vehicle is making no lateral sliding, the magnitude of the lateral acceleration Gy is equal to the estimated lateral acceleration Vr, i.e. deviation Gy-Vr is zero. However, when a lateral sliding of the vehicle occurs, deviation Gy-Vr, i.e. lateral slide acceleration, shifts out of zero, and therefore, lateral slide velocity Vy obtained by integrating the lateral slide acceleration shifts out of zero. The ratio Vy/V of such lateral slide velocity Vy to vehicle speed V expresses slip angle β of the vehicle body. Yaw rate r of the vehicle body can be presumed from vehicle speed V and steering angle θ, being named as presumed yaw rate rhat hereinbelow. If the vehicle is making no lateral sliding, the magnitude yaw rate r is equal to the presumed yaw rate rhat, i.e. different Δr equal to rhat-r, i.e. slip angle velocity, is zero. However, when a lateral sliding of the vehicle occurs, deviation Δr shifts out of zero (construction 15).

Therefore, turn behavior of the vehicle such as drift out or spin can be presumed based upon the comparison of lateral acceleration Gy against product Vr (i.e. deviation Gy-Vr), lateral slide velocity Vy, slip angle β of the vehicle body, yaw rate deviation Δr or the like, and by a control, for example, of braking force applied to each vehicle wheel, based upon the results of such presumption, turn behavior of the vehicle can be controlled so as to decrease or suppress an unstable behavior of the vehicle such as spinning.

The value of lateral acceleration Gy of a vehicle body obtained by an acceleration sensor or the like is generally liable to various errors, and therefore, the lateral velocity Vy of the vehicle obtained by integration of deviation Gy-Vr often includes an accumulation of such errors. Therefore, when the turn behavior of the vehicle is presumed based upon such lateral velocity Vy, the behavior would be often erroneously presumed.

According to the device having the above-mentioned construction 1, deviation Gy-Vr is integrated with a predetermined integration time constant to obtain lateral slide velocity Vy and turn behavior of the vehicle is presumed based upon at least the lateral slide velocity Vy by the turn behavior presuming means, and turn behavior of the vehicle is controlled based upon the presumed turn behavior by the turn behavior control means, wherein the turn behavior presuming means includes means for modifying the integration time constant such that the integration time constant is set to be smaller when a stable turn behavior of the vehicle is presumed than when an unstable turn behavior of the vehicle is presumed, and therefore, when the turn behavior of the vehicle is stable, accumulation of the errors is decreased so that it is avoided that the turn behavior of the vehicle is erroneously presumed due to an accumulation of the errors, whereas when the turn behavior of the vehicle is so unstable that an accumulation of the errors is not so essential but substantial amounts of turn behavior control parameters should be definitely available, the integration time constant is set to be larger such that a definite magnitude of lateral slide velocity Vy is ensured, based upon which the unstable turn behavior of the vehicle is definitely and effectively corrected.

According to the device having the above-mentioned construction 2, lateral slide velocity Vy of a vehicle is obtained by integrating deviation Gy-Vr with a predetermined integration time constant and turn behavior of the vehicle is presumed based upon at least the lateral slide velocity Vy by the behavior presuming means, and the turn behavior of the vehicle is controlled based upon the presumed turn behavior by the behavior control means, wherein, when the direction of the lateral slide velocity Vy is in contradiction to the direction of another parameter of the vehicle from the view point of dynamics, or in other words, when a large error is included in the lateral slide velocity Vy thus obtained due to errors included in the lateral acceleration Gy and the integration thereof, the magnitude of the lateral slide velocity Vy is modified to be decreased by the lateral slide velocity modification means, and it is definitely prevented that the turn behavior of the vehicle is erroneously presumed due to inclusion of a large error in the lateral slide velocity Vy.

Road surfaces on which vehicles such as automobiles run are generally provided with a cant that a central portion thereof is raised relative to opposite side edge portions. Therefore, when a vehicle turns along a road having such a cant, the vehicle body is applied with a lateral force due to the cant. Therefore, if such a force is disregarded, the lateral acceleration Gy during a turn can not be correctly detected, and therefore the turn behavior of the vehicle can not be correctly presumed.

According to the device having the above-mentioned construction 3, turn behavior of a vehicle is presumed based upon at least lateral acceleration Gy by the behavior presuming means, and turn behavior of the vehicle is controlled based upon the presumed turn behavior by the behavior control means, wherein the behavior presuming means comprises means for detecting vehicle speed V, means for detecting yaw rate r of the vehicle body, means for calculating deviation Gy-Vr, means for calculating a cant compensation quantity as a low frequency component of deviation Gy-Vr, and means for modifying the lateral acceleration Gy by the cant compensation quantity, so that the turn behavior of the vehicle is presumed based upon the modified lateral acceleration Gya, and therefore, the lateral acceleration during a turn of the vehicle is correctly calculated regardless whether the road surface has or has not any magnitude of cant, whereby the turn behavior of the vehicle is correctly presumed.

When a vehicle runs along a curved road with the outside vehicle wheels of the turn being supported at a higher level than the inside vehicle wheels of the turn by a cant of the road surface, the lateral acceleration Gy is modified to be decreased by the cant compensation quantity so that the turn behavior of the vehicle is more correctly presumed. However, when a vehicle runs along a curved road with the outside vehicle wheels of the turn being supported by the road surface at a lower level than the inside vehicle wheels due to a cant of the road surface, the lateral acceleration Gy is modified to be increased by the cant compensation quantity. In this case, the lateral slide velocity Vy calculated based upon deviation Gy-Vr increases due to the cant compensation, leading to a possibility that the behavior presuming means presumes that the vehicle is making a spin although it is making no such spin.

According to the device having the above-mentioned construction 4, the behavior presuming means is adapted to comprise means for calculating lateral slide velocity Vy through integration of deviation Gya-Vr between the modified lateral acceleration Gya and Vr, means for presuming spin of the vehicle based upon the lateral slide velocity Vy, and means for modifying the cant compensation quantity to zero when the modification by the cant compensation quantity increases the lateral slide velocity Vy in a condition that a spin of the vehicle is presumed, whereby it is definitely avoided that a spin is erroneously presumed due to the modification of the lateral acceleration Gy by the cant compensation quantity although the vehicle is making no spin.

When a vehicle makes a spin, the magnitude of the yaw rate increases abruptly, so that the magnitude of the product Vr increases abruptly relative to the magnitude of the lateral acceleration Gy. In contrast, when Gy decreases abruptly relative to Vr, it is considered that Gy was disturbed by a road surface condition. In any event, if the lateral slide velocity Vy is calculated based upon the lateral acceleration Gy including such a road surface disturbance, the turn behavior of the vehicle is not correctly presumed.

According to device having the above-mentioned construction 5, the lateral slide velocity Vy of a vehicle is obtained through integration of deviation Gy-Vr with a predetermined integration time constant and turn behavior of the vehicle is presumed based upon at least the lateral slide velocity Vy by the behavior presuming means, and turn behavior of the vehicle is controlled based upon the presumed turn behavior by the behavior control means, wherein the behavior presuming means includes means for modifying the lateral acceleration Gy such that the rate of change thereof is decreased in obtaining the lateral slide velocity Vy when the absolute value of Gy is decreasing under the condition that the absolute value of Gy is smaller than the absolute value of Vr, whereby the possibility of erroneously presuming turn behavior of the vehicle due to a road surface disturbance is decreased.

Curved portions of roads for vehicles such as automobiles are generally provided with a bank angle according to a regulation regarding the construction of roads to help better performance of vehicles. Therefore, the lateral acceleration Gy of a vehicle body detected by a lateral acceleration sensor includes a component due to the bank angle in the same manner as caused by the cant of the road surface, and therefore, there is a possibility that turn behavior of the vehicle is not correctly presumed due to such a bank angle. It will be possible to approximately guess the bank angle from the speed limit and the radius of curvature of the road, while radius of curvature of the road will be approximately guessed from vehicle speed and yaw rate of the vehicle body.

According to the device having the above-mentioned construction 6, lateral slide velocity Vy of a vehicle is obtained through integration of deviation Gy-Vr with a predetermined integration time constant and turn behavior of the vehicle is presumed based upon at least the lateral slide velocity Vy by the behavior presuming means, and turn behavior of the vehicle is controlled based upon the presumed turn behavior by the behavior control means, wherein the behavior presuming means includes means for obtaining radius of curvature of a road on which the vehicle runs, means for presuming bank angle of the road surface from the radius of curvature, and means for modifying the lateral acceleration Gy according to the presumed bank angle, such that the turn behavior of the vehicle is presumed based upon the modified lateral acceleration, whereby, when the vehicle runs along a curved road having a bank angle, turn behavior of the vehicle is more precisely presumed than in the case where the lateral acceleration Gy is not modified according to the bank angle.

When turn behavior of a vehicle is stable, the precision of turn behavior presumption based upon the presumption of lateral sliding dependent upon the lateral acceleration Gy is liable to errors of a cant of road surface, etc. whereas when turn behavior of the vehicle is unstable as in a condition where a spin has occurred, the reliability of target yaw rate based upon vehicle speed and steering angle is low, and therefore the reliability of deviation $\Delta r$ of the yaw rate is also low, and therefore the precision of the turn behavior presumption based upon the deviation of yaw rate deteriorates.

According to the device having the above-mentioned construction 7, a first estimation quantity expressing lateral sliding of a vehicle is calculated based upon lateral acceleration Gy, vehicle speed V and actual yaw rate r, a second estimation quantity expressing deviation $\Delta r$ between target yaw rate obtained from steering angle $\theta$ and vehicle speed V and the actual yaw rate r is calculated, turn behavior of the vehicle is presumed based upon at least said first and second estimation quantities each weighted individually with weighing factors by the behavior presuming means, and turn behavior of the vehicle is controlled based upon the presumed turn behavior by the behavior control means, wherein the behavior presuming means includes the means for modifying the weighing factors of said first and second estimation quantities such that said second estimation quantity is more weighed when the turn behavior of the vehicle is stable, while said first estimation quantity is more weighed when the turn behavior of the vehicle is unstable, whereby when the turn behavior of the vehicle is stable, turn behavior of the vehicle is presumed with said second estimation quantity expressing the yaw rate deviation $\Delta r$ being more influential, whereas when the turn behavior of the vehicle is unstable, turn behavior of the vehicle is presumed with said second estimation quantity based upon the lateral acceleration Gy being more influential. By this arrangement, the turn behavior of the vehicle is more effectively controlled.

Although it is generally desirable for preventing a vehicle to spin severely that vehicle speed and steering angle are decreased at an early stage when the vehicle has started to slide laterally, since a confused driver often turns the steering wheel more in the turning direction, if target yaw rate is calculated based upon steering angle $\theta$ as it was just detected under such a circumstance, the deviation of yaw rate $\Delta r$ becomes very large, and therefore, turn behavior of the vehicle is not correctly presumed, or the spin will be augmented.

According to the device having the above-mentioned construction 8, a first estimation quantity expressing lateral sliding of the vehicle is calculated based upon lateral acceleration Gy, vehicle speed V and actual yaw rate r, a second estimation quantity expressing deviation $\Delta r$ between target yaw rate obtained from steering angle $\theta$ and vehicle speed V and the actual yaw rate r is calculated, spin of the vehicle is presumed based upon at least said first and second estimation quantities by the behavior presuming means, and turn behavior of the vehicle is controlled so as to decrease the spin based upon the presumed spin by the behavior control means, wherein said second estimation quantity is calculated in such a manner that the target yaw rate is calculated at a predetermined cycle, and when the spin is presumed by the behavior presuming means while the steering angle $\theta$ is decreasing, the target yaw rate at the current cycle is replaced by the target yaw rate at a preceding cycle for the calculation of said second estimation quantity, and by this arrangement, even when a confused driver turns the steering wheel more to the turning direction, the turn behavior of the vehicle is correctly presumed, and it is definitely avoided that the spin is augmented by the behavior control.

On the other hand, when a lateral sliding of a vehicle occurs, some confused driver turns the steering wheel in the direction opposite to the turning direction. Under such a circumstance, if the target yaw rate is calculated by employing the steering angle θ just as detected, the yaw rate deviation Δr does not correspond to the behavior of the vehicle, disturbing correct presumption of the turn behavior of the vehicle.

According to the device having the above-mentioned constructions 9, a first estimation quantity expressing lateral sliding of a vehicle based upon lateral acceleration Gy, vehicle speed V and actual yaw rate r is calculated, a second estimation quantity expressing deviation Δr between the target yaw rate obtained from steering angle θ and vehicle speed V and the actual yaw rate r is calculated, spin of the vehicle is presumed based upon at least said first and second estimation quantities by the behavior presuming means, and turn behavior of the vehicle is controlled so as to decrease the spin based upon the presumed spin by the behavior control means, wherein the behavior presuming means includes means for limiting the magnitude of said second estimation quantity not to be greater than a predetermined value when the actual yaw rate is smaller than the target yaw rate, and by such an arrangement, it is avoided that said second estimation quantity cancels the effect of said first estimation quantity in presuming the actual spin of the vehicle, whereby even when a confused driver turns the steering wheel in the direction opposite to the turning direction, the turn behavior of the vehicle is correctly presumed.

Since the actual turn movement of a vehicle generally is delayed relative to the operation of the steering wheel, it is desirable that the target yaw rate determined from steering angle θ and vehicle speed V for the calculation of yaw rate deviation Δr is processed to incorporate a primary delay. Since a vehicle is temporarily rendered to an understeer state during a turn due to elastic deformation of tires, such an understeer performance can be erroneously presumed as caused by a tire slip. Further, if the time constant of the primary delay processing of the target yaw rate is not properly set, the yaw rate deviation Δr is presumed to be small even when a spin of the vehicle has occurred, thereby delaying the presumption of the spin.

According to the device having the above-mentioned construction 10, a first estimation quantity expressing lateral sliding of a vehicle is calculated based upon lateral acceleration Gy, vehicle speed V and actual yaw rate r, a second estimation quantity expressing deviation Δr between target yaw rate obtained from steering angle θ and vehicle speed V and the actual yaw rate r is calculated, spin of the vehicle is presumed based upon at least the first and second estimation quantities by the behavior presuming means, and turn behavior of the vehicle is controlled so as to decrease the spin based upon the presumed spin by the behavior control means, wherein the target yaw rate obtained from steering angle θ and vehicle speed V is processed to incorporate a primary delay, and the time constant of the primary delay processing is modified such that when the target yaw rate after the primary delay processing is not between the target yaw rate before the primary delay processing and the actual yaw rate, the time constant is modified to be smaller than that at a time when the target yaw rate after the primary delay processing is between the target yaw rate before the primary delay processing and the actual yaw rate. By this arrangement, the target yaw rate is modified to correspond to the yaw rate of the vehicle body generated in accordance with the steering angle and the vehicle speed, thereby ensuring a proper presumption of the turn behavior of the vehicle.

The lateral acceleration of Gy of a vehicle body detected by a lateral acceleration sensor is liable to disturbances such as convex and concave of road surface, and therefore, if a vehicle makes a turn along a road of poor surface condition, turn behavior of the vehicle will be erroneously presumed due to those disturbances.

According to the device having the above-mentioned construction 11, a first estimation quantity expressing lateral sliding of a vehicle is calculated based upon lateral acceleration Gy, vehicle speed V and actual yaw rate r, a second estimation quantity expressing deviation Δr between target yaw rate obtained from steering θ and vehicle speed V and the actual yaw rate r is calculated, turn behavior of the vehicle is presumed based upon at least said first and second estimation quantities by the behavior presuming means, and turn behavior of the vehicle is controlled by a control amount according to a final estimation quantity depending upon the presumed turn behavior of the vehicle by the control means, wherein there are provided means for detecting wheel speeds of left and right front vehicle wheels, means for detecting actual longitudinal acceleration of the vehicle, means for calculating presumed yaw rate rhat of the vehicle body from the wheel speeds of the left and right front vehicle wheels, means for calculating presumed longitudinal acceleration Gxhat from the wheel speeds of the left and right front vehicle wheels, means for presuming disturbance level of road surface from the deviation between the actual yaw rate r and the presumed yaw rate rhat and the deviation between the actual longitudinal acceleration Gx and the presumed longitudinal acceleration Gxhat, and means for modifying the control amount according to the disturbance level of the road surface, so that the behavior control of the vehicle is definitely maintained so as not to be caused errors even when the lateral acceleration Gy is affected by convex and concave of road surface.

According to the device having the above-mentioned construction 12, the control amount modifying means is adapted so as to modify the control amount by modifying the final estimation quantity according to the level of road surface disturbance.

According to the device having the above-mentioned construction 13, the behavior control means is adapted to control the turn behavior of the vehicle by the control amount depending upon the final estimation quantity when the final estimation quantity exceeds a threshold value, and the control amount modifying means is adapted to modify the control amount by modifying the threshold value according to the road surface disturbance level, whereby the functions of the device having the above-mentioned construction 11 are definitely ensured.

When a vehicle is making a turn under a stable turn behavior, the deviation between target yaw rate determined from steering angle θ and vehicle speed V and actual yaw rate is small, and the deviation between target lateral acceleration determined from steering angle and vehicle speed and actual lateral acceleration is also small, and therefore, if these deviations are small, while an estimation quantity expressing lateral sliding of the vehicle is high, the increase of the estimation quantity is considered to be due to external disturbances.

According to the device having the above-mentioned construction 14, an estimation quantity expressing lateral sliding of a vehicle is calculated based upon lateral acceleration Gy and actual yaw rate r, spin of the vehicle is presumed based upon at least said estimation quantity by the behavior presuming means, and turn behavior of the vehicle is controlled so as to decrease the spin based upon the presumed spin by the behavior control means, wherein there are provide means for detecting vehicle speed V, means for detecting steering angle θ, means for calculating target lateral acceleration Gyt from steering angle θ and vehicle speed V, means for judging if the deviation between the target yaw rate rt and the actual yaw rate r or the deviation between the target lateral acceleration Gyt and the lateral acceleration Gy is not greater than a predetermined threshold value, and means for prohibiting the behavior control by the behavior control means when the yaw rate deviation or the lateral acceleration deviation is not greater than the threshold value, and by such arrangement, it is definitely avoided that an erroneous control of the vehicle is executed according to a high magnitude of said estimation quantity expressing lateral sliding of the vehicle when such a high magnitude was caused by external disturbances.

A vehicle is generally apt to spin when it is braked during turn or when it is accelerated in understeer condition. Therefore, under those operating conditions, it is desirable that, when a spin occurs the turn behavior control is immediately started, while on the other hand, unless those conditions are met, it is desirable that the turn behavior control is not erroneously executed.

According to the device having the above-mentioned construction 15, an estimation quantity expressing lateral sliding of a vehicle is calculated from lateral acceleration Gy and actual yaw rate r, spin of the vehicle is presumed based upon at least said estimation quantity by the behavior control means, and turn behavior of the vehicle is controlled so as to decrease the spin based upon the presumed spin by the behavior control means, wherein the behavior control means is adapted comprise means for judging a first condition that the vehicle is braked during turn, means for judging a second condition that the vehicle is accelerated in understeer condition, and means for expediting the behavior control by the behavior control means when said first and second conditions are judged, and by such an arrangement, when the vehicle is in a condition of high probability of being put into spin, the turn behavior control is immediately started at occurrence of spin, so that the turn behavior of the vehicle is effectively controlled, whereas when the vehicle is in a condition of low probability of being put into spin, the behavior control by the behavior control means is not readily executed, so that the probability of an erroneous behavior control being executed is decreased when the turn behavior of the vehicle is stable.

BRIEF DESCRIPTION OF THE DRAWINGS

In the accompanying drawings.

DESCRIPTION OF THE EMBODIMENTS

In the following, the invention will be described in more detail with respect to the embodiments thereof with reference to the accompanying drawings.

Figure 1:
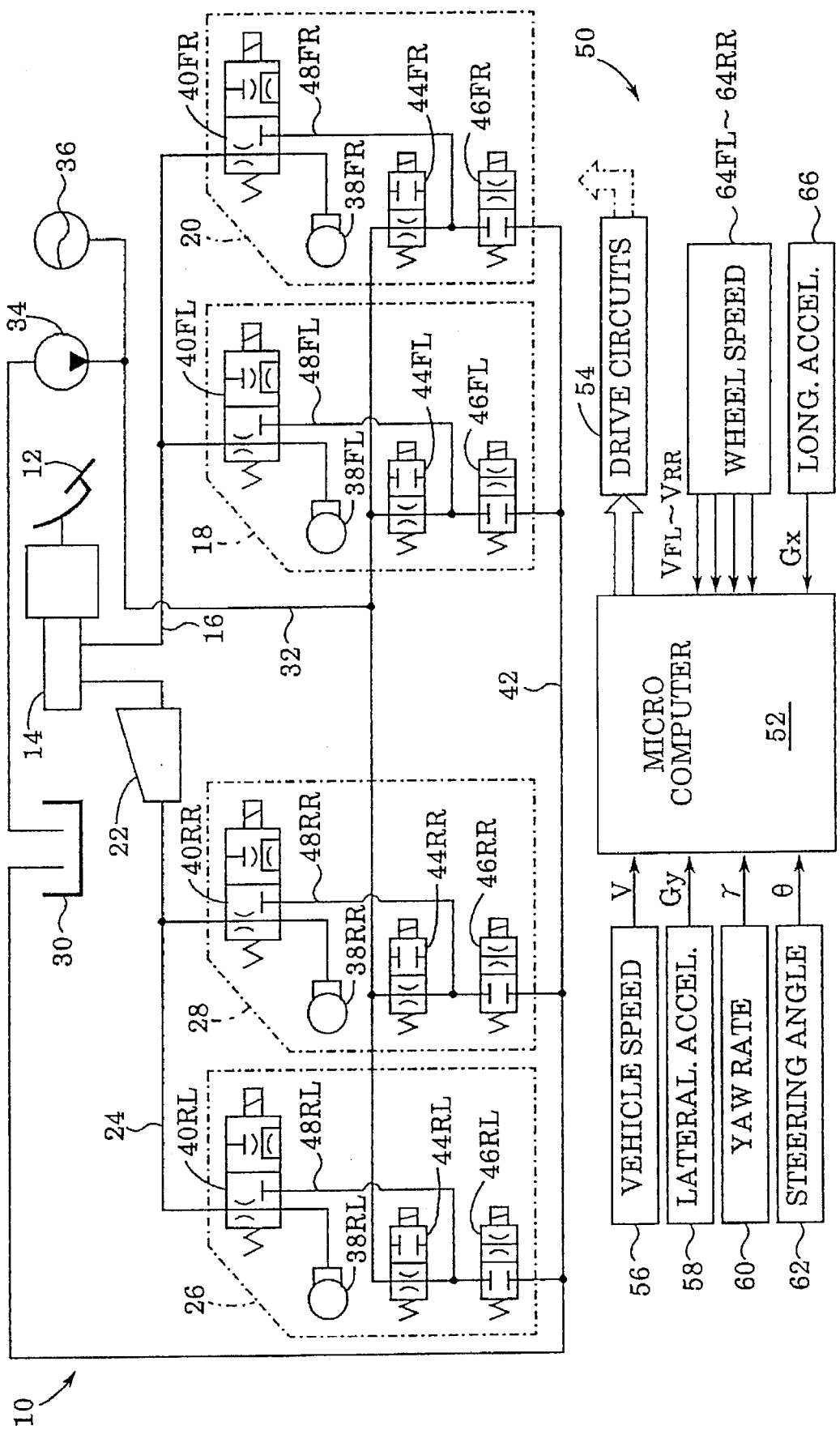
FIG. 1 is a schematic view showing the braking system and the electric control system of a vehicle to which the behavior control device of the present invention is applied.

In FIG. 1, the braking system 10 includes a master cylinder 14 which pumps out brake fluid through first and second ports thereof in response to stepping on action of a brake pedal 12 by a driver, the first port being connected through a conduit 16 to brake fluid control means 18 and 20 for left and right front vehicle wheels, said second port being connected with brake fluid control means 26 and 28 through a conduit 24 including a proportional valve 22 at a middle portion thereof of rear vehicle wheels. The brake system 10 also includes a reservoir 30 containing the brake fluid and a pump 34 which pumps up the brake fluid from the reservoir and delivers high pressure fluid to a high pressure conduit 32 which is connected to the brake fluid control means 18, 20, 26 and 28, and an accumulator 36 connected to a middle portion thereof.

The respective brake fluid control means 18, 20, 26 and 28 include oil cylinders 38FL, 38FR, 38RL, 38RR for controlling brake forces applied to the respective vehicle wheels, three ports two position switching over type electromagnetic control valves 40FL, 40FR, 40RL, 40RR, normally open type electromagnetic on-off valves 44FL, 44FR, 44RL, 44RR provided between a high pressure conduit 32 and a low pressure conduit 42 connected to the reservoir 30, and normally closed type electromagnetic on-off valves 46FL, 46FR, 46RL, 46RR, corresponding to front left, front right, rear left and rear right vehicle wheels. The portions of the high pressure conduit 32 located respectively between on-off valves 44FL, 44FR, 44RL, 44RR and on-off valves 46FL, 46FR, 46RL, 46RR are respectively connected to the control valves 40FL, 40FR, 40RL, 40RR by connecting conduits 48FL, 48FR, 48RL, 48RR.

The control valves 40FL and 40FR are respectively switched over between a first position shown in FIG. 1 connecting the brake fluid pressure control conduit 16 with wheel cylinders 38FL and 38FR while disconnecting the wheel cylinders 38FL and 38FR from the connection conduits 48FL and 48FR and a second position disconnecting the brake fluid pressure control conduit 16 from the wheel cylinders 38FL and 38FR while connecting wheel cylinders 38FL and 38FR with connection conduits 48FL and 48FR. Similarly, the control valves 40RL and 40RR are respectively switched over between a first position shown in FIG. 1 connecting the brake fluid pressure control conduit 24 for the rear vehicle wheels with the wheel cylinders 38RL and 38RR while disconnecting the wheel cylinders 38RL and 38RR from the connection conduits 48RL and 48RR and a second position disconnecting the brake fluid pressure control conduit 24 from the wheel cylinders 38RL and 38RR while connecting the wheel cylinders 38RL and 38RR with the connection conduit 48RL and 48RR.

When the control valves 40FL, 40FR, 40RL, 40RR are at the second position, and the on-off valves 44FL, 44FR, 44RL, 44RR and the on-off valves 46FL, 46FR, 46RL, 46RR are shifted to the conditions shown in FIG. 1, the wheel cylinders 38FL, 38FR, 38RL, 38RR are connected with the high pressure conduit 32 through the control valves 40RL, 40FR, 40RL, 40RR and the connection conduits 48FL, 48FR, 48RL, 48RR, whereby the pressure in each wheel cylinder is increased. In contrast, when the control valves 40FL, 40FR, 40RL, 40RR are at the second position and the on-off valves 44FL, 44FR, 44RL, 44RR are closed while the on-off valves 46FL, 46FR, 46RL, 46RR are opened, the wheel cylinders are connected with the low pressure conduit 42 through the control valves and the connection conduits, whereby the pressure in each wheel cylinder is decreased. When the control valves are at said second position and the on-off valves 44FL, 44FR, 44RR, 44RL and the on-off valves 46FL, 46FR, 46RL, 46RR are closed, the wheel cylinders are disconnected from both the high pressure conduit 32 and the low pressure conduit 42, whereby the pressure in each wheel cylinder is maintained.

Thus, the brake system 10 operates such that, when the control valves 40FL, 40FR, 40RL, 40RR are at said first position, the wheel cylinders 38FL, 38FR, 38RL, 38RR generate braking force according to the amount of stepping on of the brake pedal 12 by the driver, whereas when the control valves 40FL, 40FR, 40RL, 40RR are at said second position, the wheel cylinders generate or release braking force according to opposite on-off control operations of the on-off valves 44FL, 44FR, 44RL, 44RR and the on-off valve 46FL, 46FR, 46RL, 46RR independently of stepping on of the brake pedal 12 and each independently of the operation of others.

The control valves 40FL, 40FR, 40RL, 40RR, the on-off valves 44FL, 44FR, 44RL, 44RR, and the on-off valves 46FL, 46FR, 46RL, 46RR are controlled by an electric control means 50, as will be described in detail hereinbelow. The electric control means 50 consists of a microcomputer 52 and driving circuit 54. The microcomputer 52 includes, though not shown in detail in FIG. 1, central processing unit (CPU), read only memory (ROM), random access memory (RAM), input and output port means, and bidirectional common bus interconnecting the above-mentioned components.

The input port means of the microcomputer 52 is supplied with a signal representing vehicle speed V from a vehicle speed sensor 56, a signal representing lateral acceleration Gy of a vehicle body from a lateral acceleration sensor 58 mounted substantially at a center of gravity of the vehicle body, a signal representing yaw rate r of the vehicle body from a yaw rate sensor 60, a signal representing steering angle θ from a steering angle sensor 62, signals representing wheel speeds of left and right front vehicle wheels and left and right rear vehicle wheels VFL, VFR, VRL, VRR from wheel speed sensors 64FL–64RR, and a signal representing longitudinal acceleration Gx of the vehicle body from a longitudinal acceleration sensor 66 mounted substantially at the center of gravity of the vehicle body. The lateral acceleration sensors 58, etc. may be adapted to provide positive outputs when the vehicle makes left turn.

ROM of the microcomputer 52 stores various control flows and maps such as described hereinbelow, and CPU conducts various calculations such as described hereinbelow based upon the parameters detected by the above-mentioned sensors to obtain spin value SV for judgement of turn behavior of the vehicle, and based upon the spin value it presumes turn behavior of the vehicle and calculates a control amount for stabilizing the turn behavior of the vehicle, and based upon such calculations controls the braking force applied to the left or right front vehicle wheel so as to stabilize the turn behavior of the vehicle.

Figure 2:
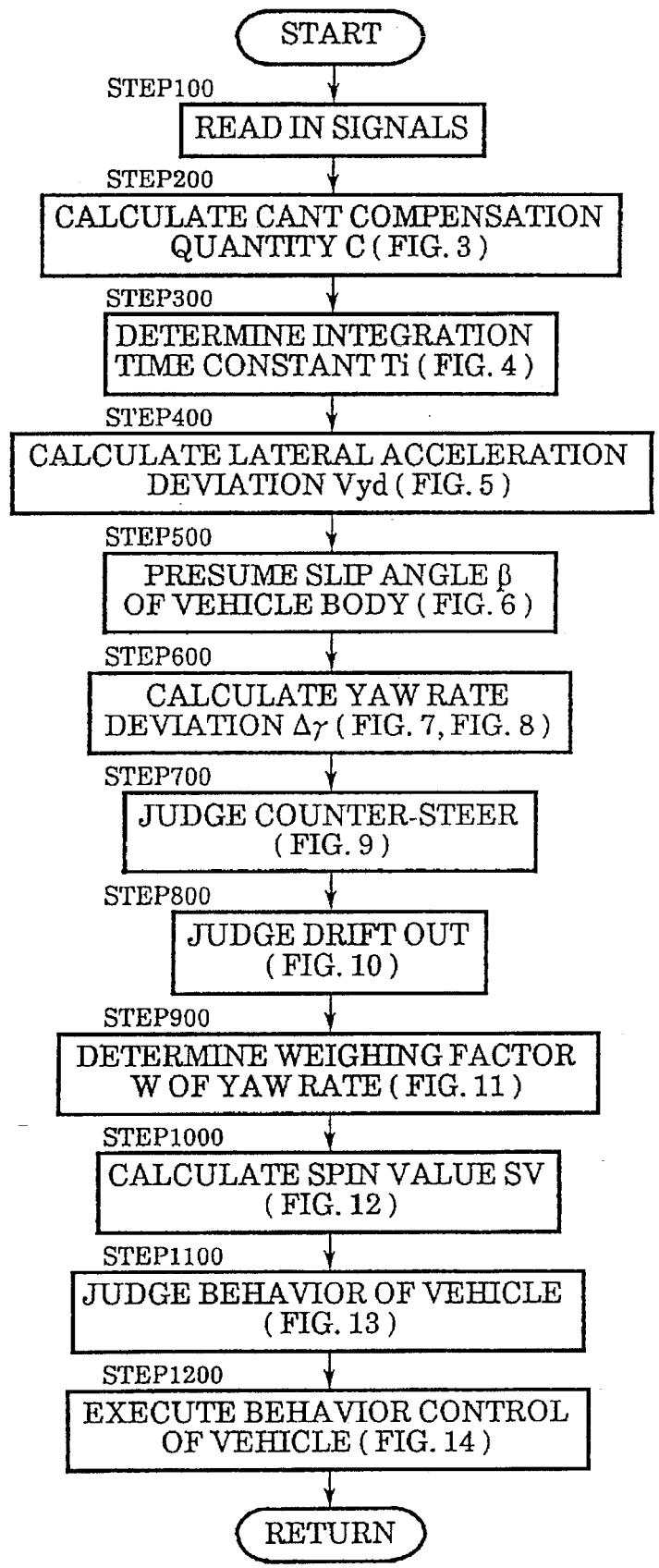
FIG. 2 is a general flowchart showing the behavior control by a first embodiment of the behavior control device according to the present invention.

In the following, the outline of the turn behavior control of a vehicle according to a first embodiment of the present invention will be described with reference to the general flowchart shown in FIG. 2. The control according to the flowchart shown in FIG. 2 is started upon closure of an ignition switch not shown in the figure and is repeated at a predetermined cycle time.

Figure 3:
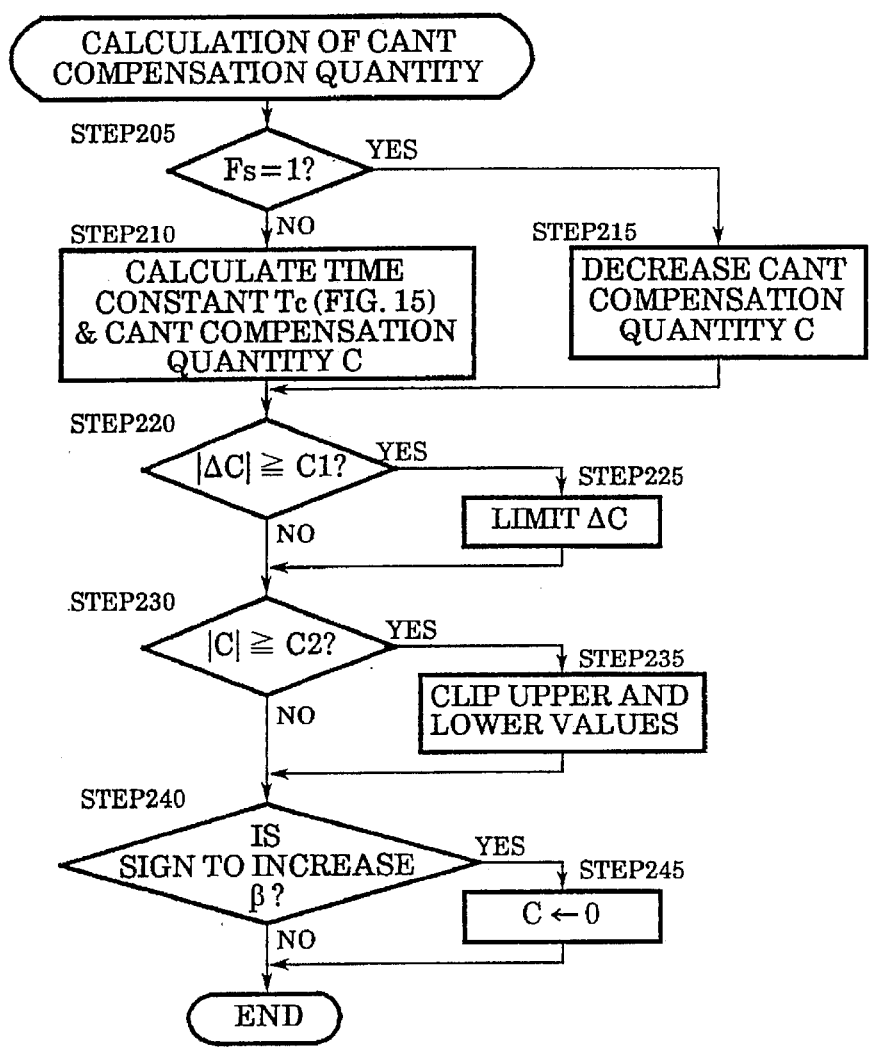
FIG. 3 is a flowchart showing the cant compensation calculation routing of step 200 in the general flowchart shown in FIG. 2.
Figure 4:
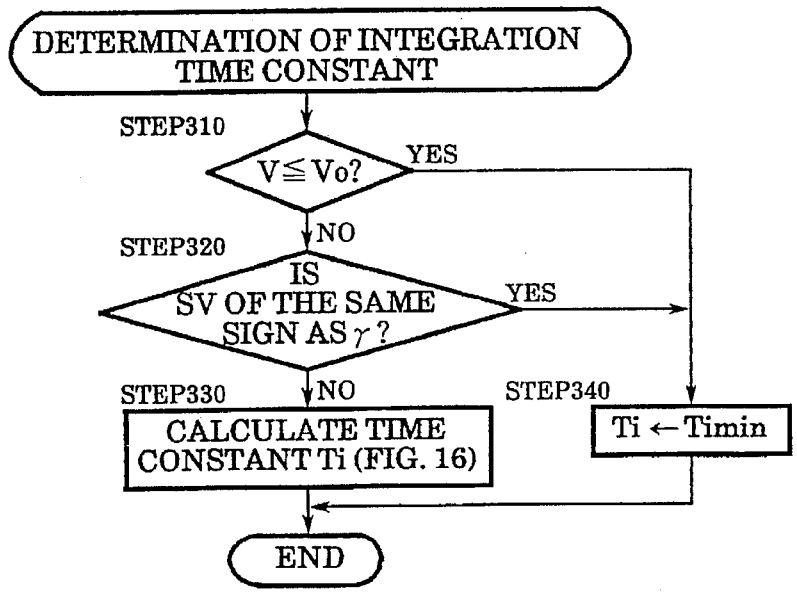
FIG. 4 is a flowchart showing the integration time constant determination routine of step 300 in the general flowchart shown in FIG. 2.
Figure 5:
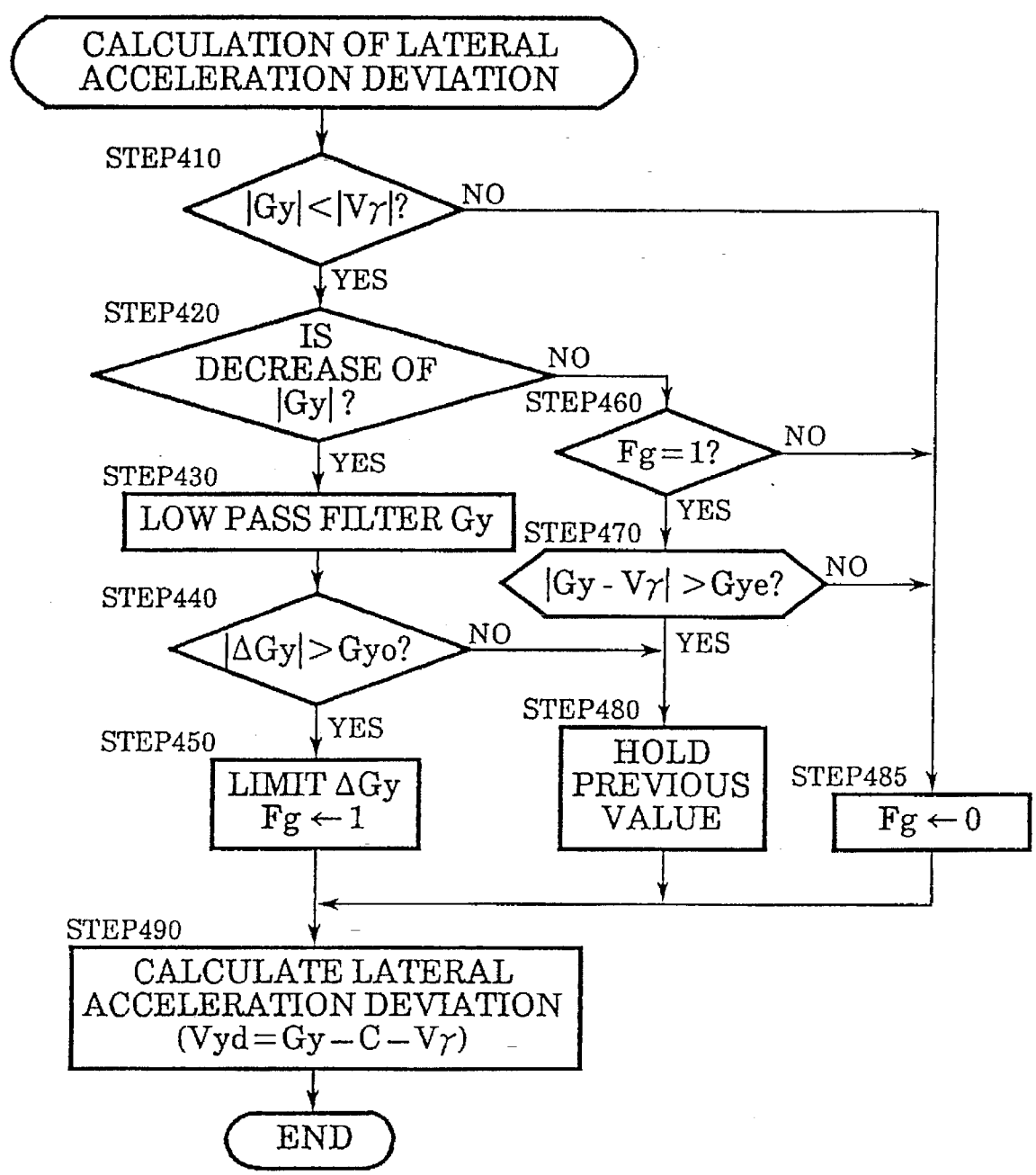
FIG. 5 is a flowchart showing the lateral acceleration deviation calculation routine of step 400 in the general flowchart shown in FIG. 2.
Figure 6:
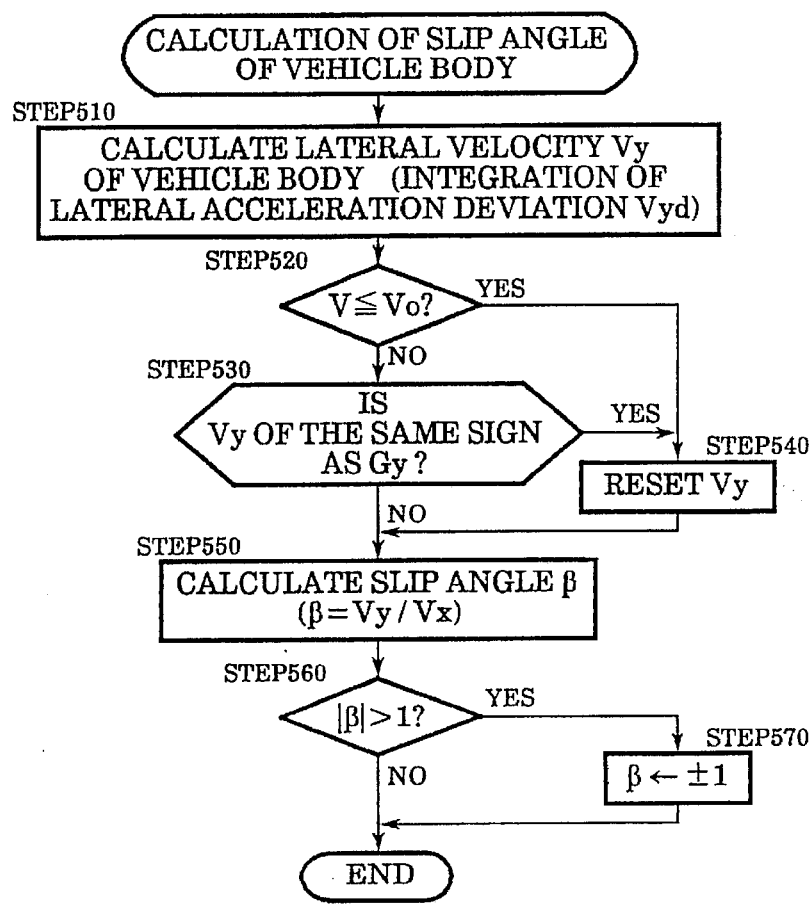
FIG. 6 is a flowchart showing the vehicle body slip angle calculation routine of step 500 in the general flowchart shown in FIG. 2.

First, at step 100, signal representing vehicle speed V obtained from the vehicle speed sensor and other signals are read in, then in step 200 cant compensation quantity C for modifying lateral acceleration Gy of the vehicle body, i.e. a compensation quantity for modifying lateral acceleration against lateral force due to cant of road surface, is calculated according to a flowchart shown in FIG. 3, then in step 300 integration time constant Ti for the calculation of lateral slide velocity Vy of the vehicle body executed in the subsequent step 500 is determined according to a flowchart shown in FIG. 4, then in step 400 deviation Vyt between actual lateral acceleration Gya (=Gy−C) modified by the cant compensation quantity C and lateral acceleration Vr of the vehicle body determined from vehicle speed V and yaw rate r is calculated according to a flowchart shown in FIG. 5, and then in step 500 slip angle β of the vehicle body is presumed according to a flowchart shown in FIG. 6.

Figure 7:
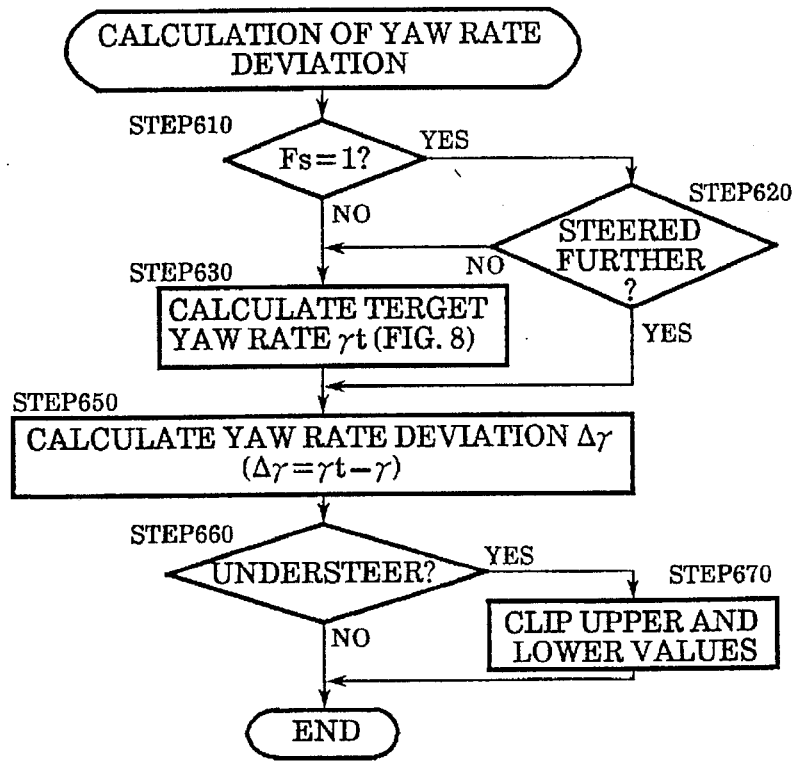
FIG. 7 is a flowchart showing the yaw rate deviation calculation routine of step 600 in the general flowchart shown in FIG. 2.
Figure 8:
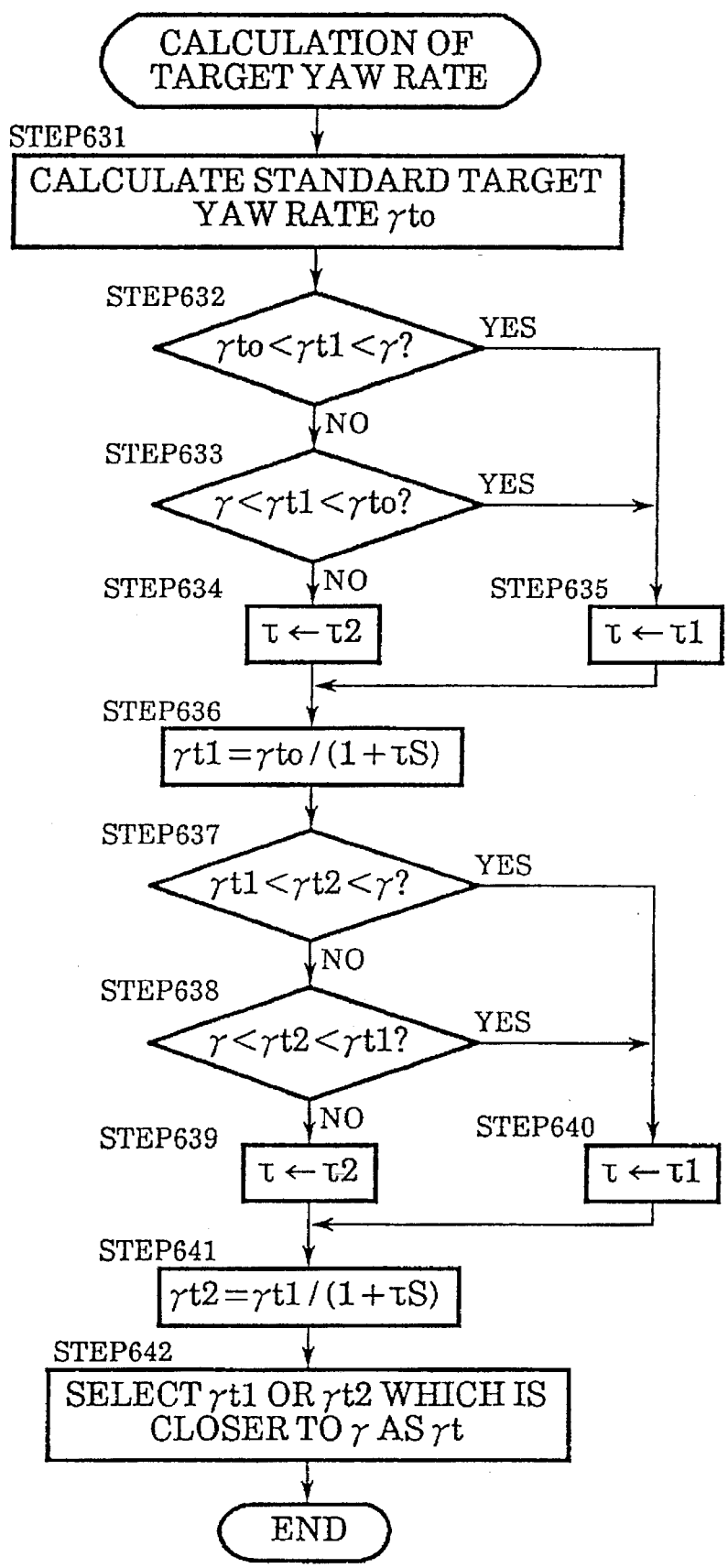
FIG. 8 is a flowchart showing the target yaw rate calculation routine of step 630 in the flowchart shown in FIG. 7.
Figure 9:
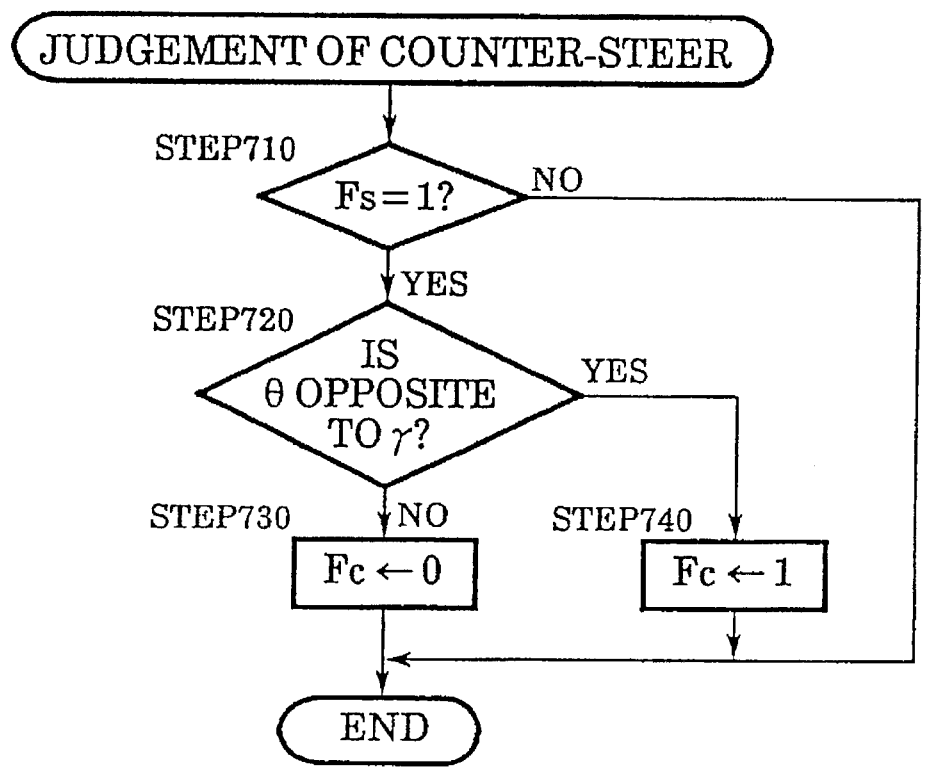
FIG. 9 is a flowchart showing the counter-steer judgement routine of step 700 in the general flowchart shown in FIG. 2.
Figure 10:
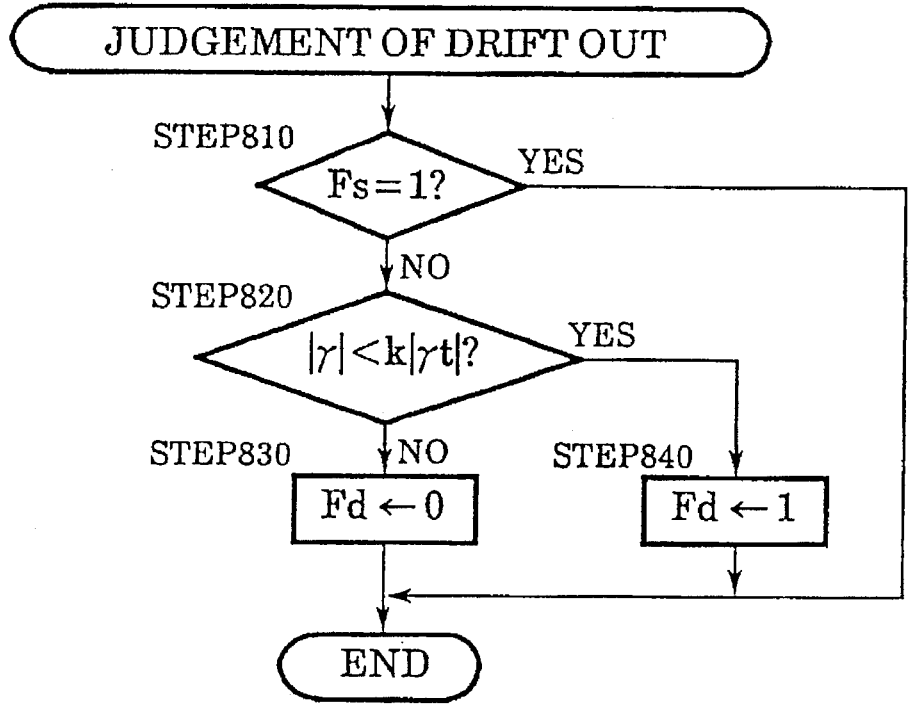
FIG. 10 is a flowchart showing the drift out judgement routine of step 800 in the general flowchart shown in FIG. 2.

Further, in step 600, deviation Δr between actual yaw rate r detected by the yaw rate sensor 60 and target yaw rate rt determined from vehicle speed V and steering angle θ is calculated according to those flowcharts shown in FIGS. 7 and 8, then in step 700 it is judged if counter-steering is made, i.e. if the steering wheel is turned in the direction of turn of the vehicle, according to a flowchart shown in FIG. 9, and then in step 800 it is judged if the vehicle is drifting out state according to a flowchart shown in FIG. 10.

Figure 11:
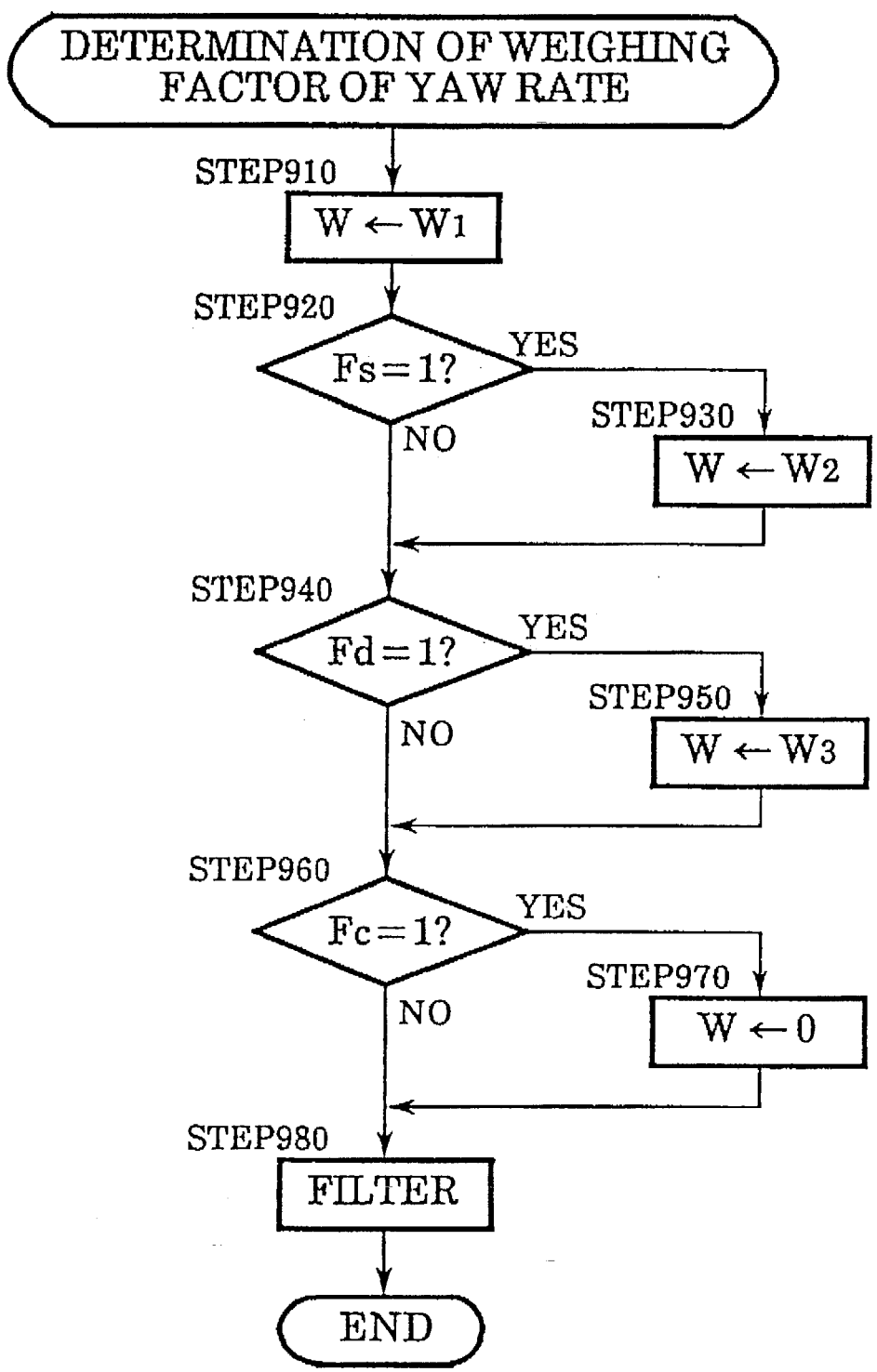
FIG. 11 is a flowchart showing the yaw rate deviation weighing factor determination routine of step 900 in the general flowchart shown in FIG. 2.
Figure 12:
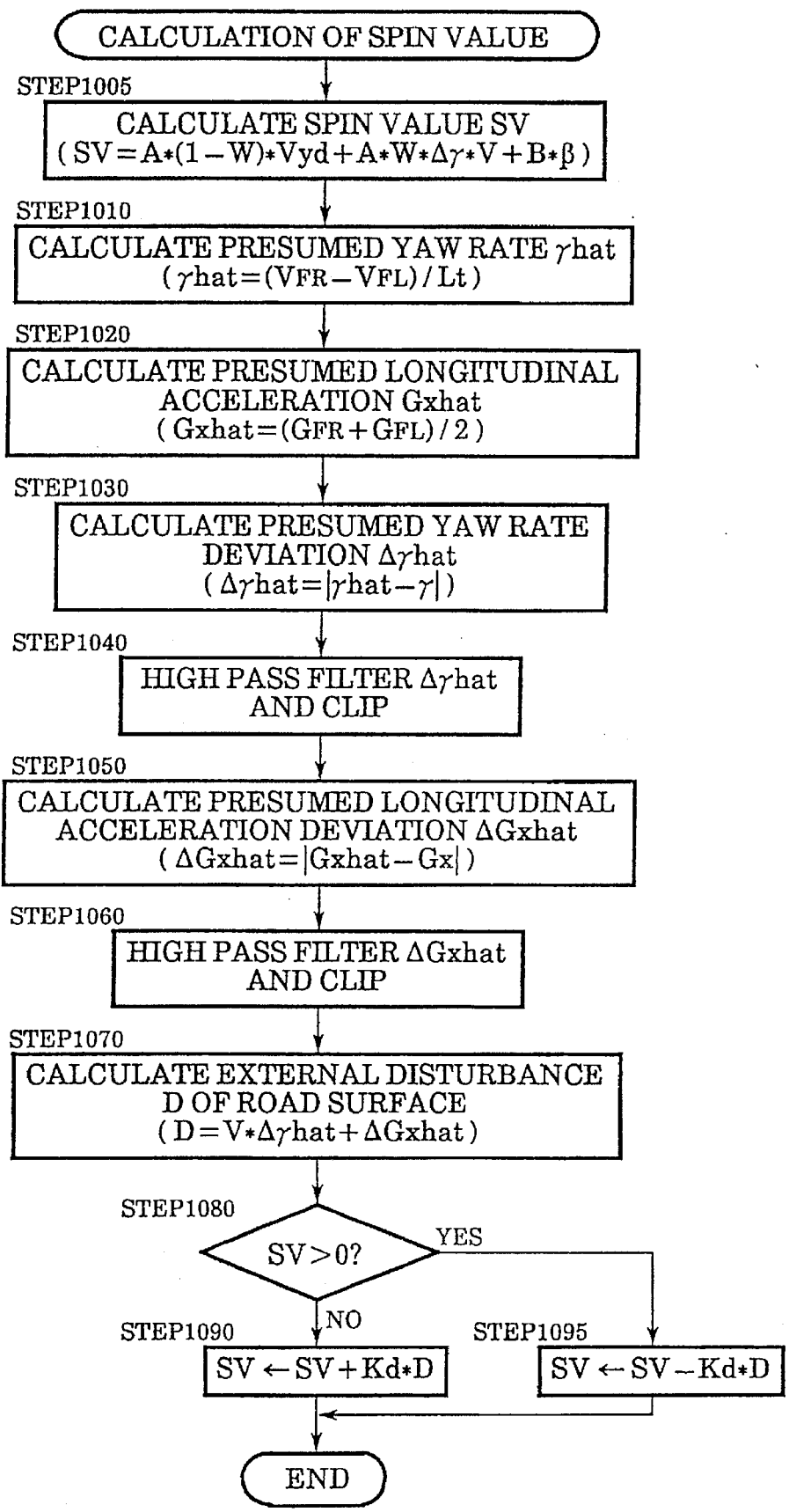
FIG. 12 is a flowchart showing the spin value calculation routine of step 1000 in the general flowchart shown in FIG. 2.
Figure 14:
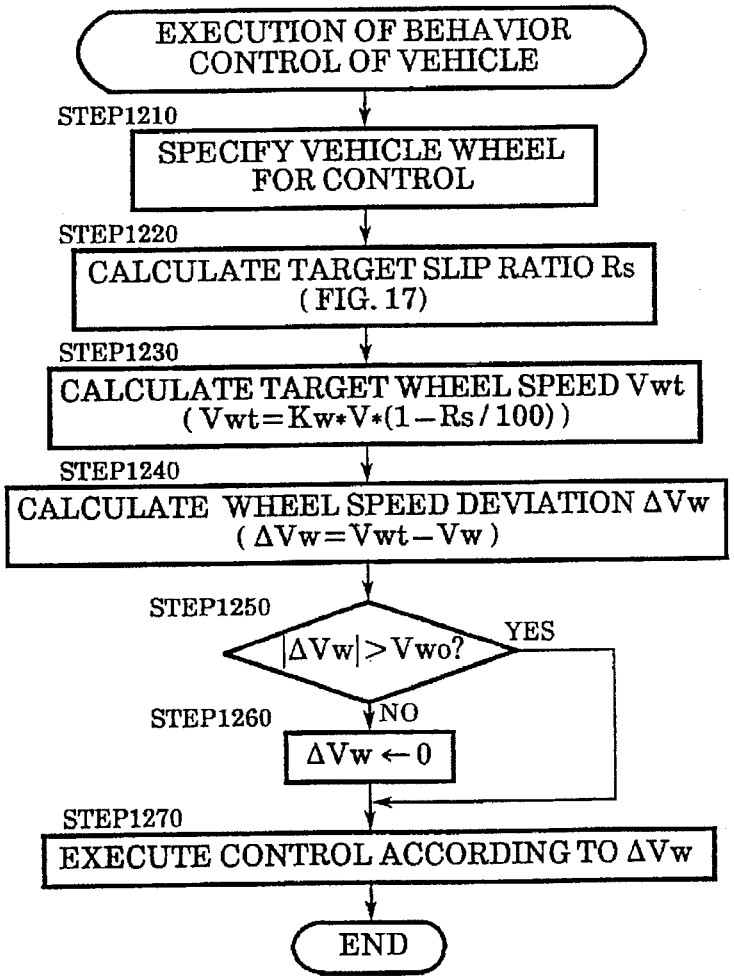
FIG. 14 is a flowchart showing the behavior control execution routine of step 1200 in the general flowchart shown in FIG. 2.

Further, in step 900 weighing factor W for the yaw rate deviation Δr calculated in step 600 is calculated according to a flowchart shown in FIG. 11, then in step 1000 spin value SV is calculated according to a flowchart shown in FIG. 12, then in step 1100 the behavior of the vehicle is judged based upon the spin value SV according to a flowchart 13, then in step 1200 control amount for controlling braking force applied to left front vehicle wheel or right front vehicle wheel is calculated based upon the result of judgement of the behavior and the spin value SV and the brake force applied to the left front vehicle wheel or the right front vehicle wheel is controlled based upon the control amount according to a flowchart shown in FIG. 14, and the control returns to step 100.

Now, respective routines of steps 200–1200 will be described in detail with reference to flowcharts shown in FIGS. 3–14 and graphs shown in FIG. 15 and subsequent figures.

Step 200 cant compensation quantity C calculation routine (FIG. 3)

In step 205, it is judged if flag Fs is 1, or in other words, if a spin was presumed with respect to turn behavior of the vehicle in step 1100 of a preceding cycle, and if the answer is no, in step 120 time constant Tc is calculated from a map corresponding to a graph shown in FIG. 15, and deviation Gy−Vr of lateral acceleration of the vehicle body is low pass filtered according to formula 1 shown hereinbelow, so as thereby to generate cant compensation quantity C. If the answer of step 205 is yes, the control proceeds to step 215, and the cant compensation quantity C is cyclically decreased by a unit balance or a unit ratio so that the cant compensation quantity is gradually decreased. In formula 1, S is the replace operator, as is the same in the subsequent formulas.

$$C=(Gy-Vr)/(1+TcS) \tag{1}$$

In step 220, the absolute value of change rate of the cant compensation quantity, i.e. deviation ΔC between the value of cant compensation quantity at the current cycle and that at a cycle preceding to the current cycle by a predetermined number of cycles, is equal to or greater than limit value C1 (positive constant), and if the answer is yes, the control proceeds to step 225, where the cant compensation quantity C is modified so that the deviation ΔC is limited to the limit value C1.

In step 230, it is judged if the absolute value of cant compensation quantity C is equal to or greater than limit value C2 (positive constant), and if the answer is yes, the control proceeds to step 235 and the cant compensation quantity is clipped to either C2 and −C2. In step 240, it is judged if the positive/negative sign of the cant compensation quantity C calculated in step 210 or modified in step 225 or 235 is the sign which increases the absolute value of slip angle β of the vehicle body calculated at step 500, or in other words, if the sign is the same as that of lateral velocity Vy calculated in step 500 in a preceding cycle, and if the answer is yes, the control proceeds to step 245 and the cant compensation quantity C is reset to zero.

Thus, the step 200 cant compensation quantity calculation routine, particularly the process of steps 205–235, correspond to a part of the above-mentioned construction 3, wherein the lateral force due to the cant of road surface, i.e. the low frequency component of the deviation Gy-Vr of lateral acceleration of the vehicle body is calculated as the cant compensation quantity, so that the lateral acceleration Gy of the vehicle body is modified by the cant compensation quantity in step 490 in the below-mentioned lateral acceleration deviation calculation routine (FIG. 5), whereby the deviation Vyd of lateral acceleration is correctly calculated regardless of any cant of road surface, and thereby slip angle β of the vehicle body is correctly calculated.

Figure 15:
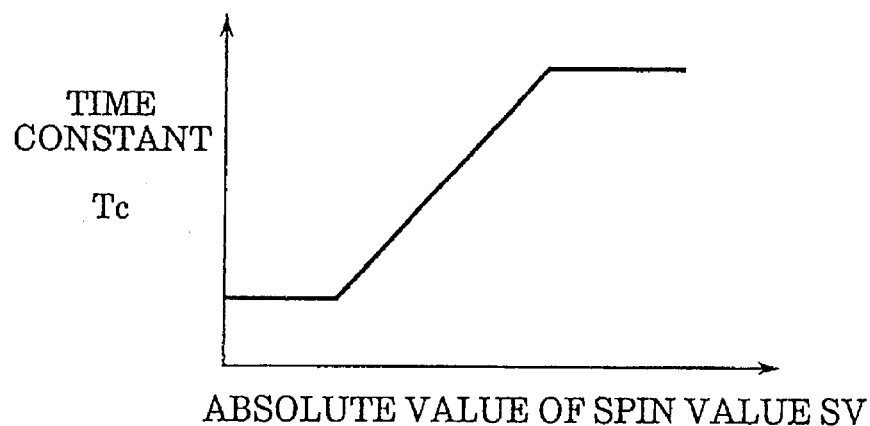
FIG. 15 is a graph showing the relation between the absolute value of spin value SV and the time constant Tc.

Further, since in the calculation of the cant compensation quantity C in step 210 the time constant Tc in the low pass filtering is set by a map corresponding to a graph shown in FIG. 15 so as to be increased as the turn behavior of the vehicle becomes unstable, when the turn behavior of the vehicle is stable, the turn behavior of the vehicle is correctly presumed and controlled by taking the cant of road surface into consideration, whereas when the turn behavior of the vehicle becomes unstable, the cant compensation quantity C is calculated to be smaller, so that the behavior control is started earlier. Further, when the vehicle has spun, it is judged in step 205, and the cant compensation quantity C is decreased in step 215, whereby it is avoided that there occurs a delay in the behavior control due to the cant control, thereby ensuring definite behavior control until the behavior stabilizes.

When the absolute value of the change rate ΔC of the cant compensation quantity or the absolute value C of the cant compensation quantity exceeds the respective limit value predetermined therefor, they are restricted to the respective predetermined values in steps 220–235, whereby it is definitely avoided that the cant compensation quantity C is erroneously calculated to be abnormally high not corresponding to the actual cant due to external disturbances from road surface, and therefore it is definitely avoided that the deviation Vyd of lateral acceleration or the slip angle β of the vehicle body is erroneously calculated to be abnormally high due to an erroneous calculation of the cant compensation quantity.

Steps 240 and 245 correspond to a part of the above-mentioned construction 4, wherein when the positive/negative sign of the cant compensation quantity C is the same as that of the lateral velocity Vy, the cant compensation quantity is compulsorily reset to zero. By this arrangement, when, for example, a vehicle runs along a curved road which has an inverse cant such that the outside edge of the turn of the road is lower than the inside edge of the turn of the road, it is avoided that a cant compensation of the lateral acceleration Gy causes an erroneous presumption of the turn behavior as if a spin had occurred when it is not the case.

Step 300 integration time constant Ti determination routine (FIG. 4)

Figure 16:
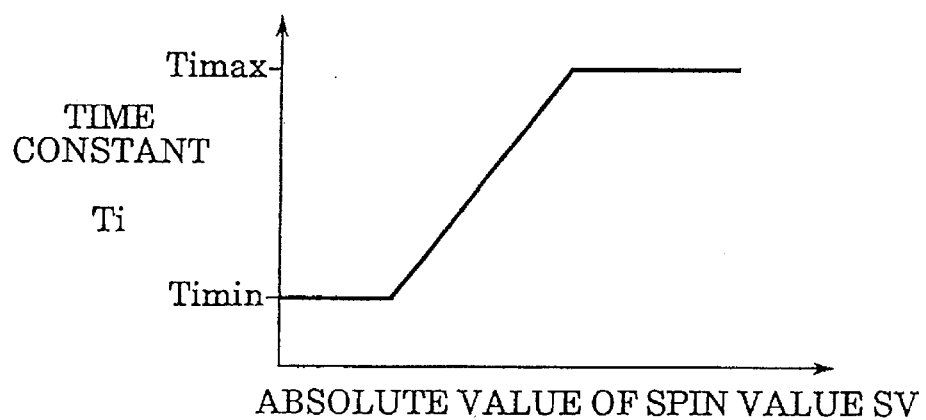
FIG. 16 is a graph showing the relation between the absolute value of spin value SV and the time constant Ti.

In step 310, it is judged if vehicle speed V is equal to or lower than a predetermined speed value Vo such as, for example, 10 km/h, and when the answer is no, then in step 320 it is judged if the positive/negative sign of spin value SV is the same as that of yaw rate r. If the answer of step 320 is no, the control proceeds to step 330, and the time constant Ti in the integration calculation of lateral velocity deviation Vyt in step 510 of the below-mentioned vehicle body slip angle β calculation routine (FIG. 6) is obtained from a map corresponding to a graph shown in FIG. 16 according to the absolute value of spin value SV, whereas if the answer of step 310 or 320 is yes, the time constant Ti is set to a minimum value Timin.

Thus, the step 300 integration time constant Ti determination routine corresponds to a part of the above-mentioned construction 1, wherein in step 330 the time constant Ti is increased such that the integration time constant is made longer as the absolute value of spin value SV is greater, i.e. the behavior of the vehicle is less stable, whereby when the turn behavior of the vehicle is stable, errors due to integration are decreased so that incorrect presumption of turn behavior of the vehicle is avoided, whereas when the turn behavior of the vehicle is unstable, the integration time constant Ti is made longer so that the lateral speed Vy is definitely calculated and the turn behavior of the vehicle is stabilized as quick as possible.

Step 400 lateral acceleration deviation calculation routine (FIG. 5)

In step 410, it is judged if the absolute value of lateral acceleration Gy is smaller than the absolute value of product Vr of vehicle speed V and yaw rate r, and if the answer is yes, the control proceeds to step 420, and it is judged if the magnitude of the lateral acceleration Gy is decreasing, and if the answer is yes, the control proceeds to step 430 and the lateral acceleration Gy is processed by low pass filtering. In step 440, it is judged if the absolute value of change rate of lateral acceleration Gy, i.e. the absolute value of ΔGy between the lateral acceleration at the current cycle and that at a cycle proceeding to the current cycle by a predetermined number of cycles, is greater than a standard value Gyo (positive constant), and if the answer is yes, the control proceeds to step 450, and the lateral acceleration Gy is modified such that the magnitude of the change rate ΔGy thereof is restricted to the standard value Gyo and flag Fg is set to 1. If the answer in step 440 is no, the control proceeds to step 480, and the lateral acceleration Gy is held to the value of the preceding cycle.

In step 460, it is judged if flag Fg is 1, and if the answer is yes, the control proceeds to step 470, and it is judged if the absolute value of deviation Gy-Vr is greater than a standard value Gye (positive constant), and if the answer is yes, the control process proceeds to step 450, and the lateral acceleration Gy is held to the value of a preceding cycle, whereas if the answer is no, the control proceeds to step 485, and flag Fg is reset to 0. In step 490, deviation of lateral velocity of the vehicle body (lateral slide acceleration) Vyd is calculated according to the following formula 2.

$$Vyd = Gy - C - Vr \quad (2)$$

Figure 18:
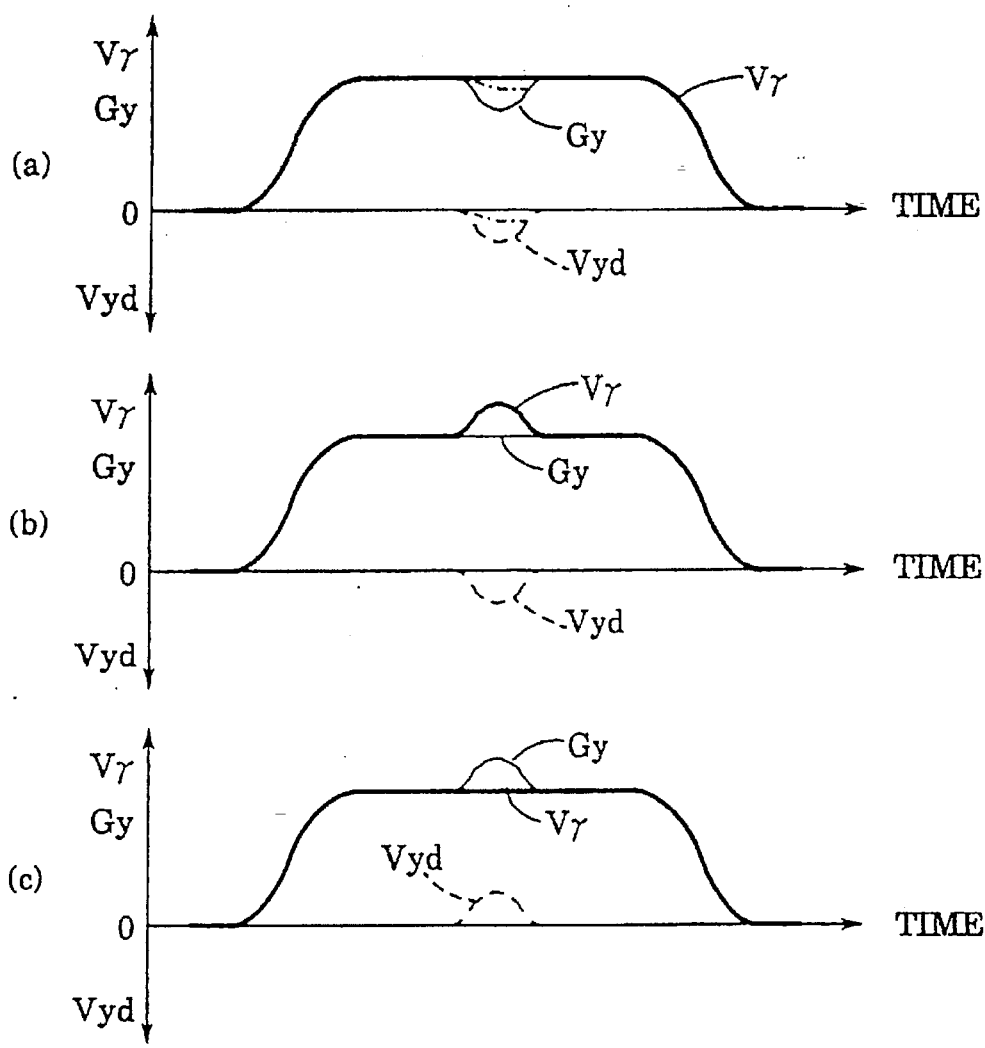
FIG. 18 is graphs showing examples of changes of lateral acceleration Gy and the product Vr.

Thus, the lateral acceleration deviation calculation routine of step 400 corresponds to a part of the above-mentioned construction 5. FIG. 18 (a) shows a case that the lateral acceleration Gy abruptly decreases to be lower than the presumed lateral acceleration Vr of the vehicle body. Such a phenomenon occurs due to an external disturbance such as a convex or concave of road surface. In this case, the answers in steps 410 and 420 are yes, and when the decreasing rate of the lateral acceleration Gy is large such that the absolute value thereof is greater than a threshold value Gyo, the answer in step 440 is yes, and then in step 450 the decreasing rate of the lateral acceleration Gy is limited. On the other hand, when the decreasing rate of the lateral acceleration Gy is relatively small, and the deviation between the lateral acceleration Gy and the product Vr is greater than a standard value Gye, the lateral acceleration is held to the value of a preceding cycle, whereby it is avoided that the turn behavior of the vehicle is erroneously presumed due to external disturbances from road surface.

FIG. 18 (b) shows a case that Vr becomes greater than Gy due to an abrupt increase of yaw rate r. Such a phenomenon is due to a spin of the vehicle. In this case, it is judged yes in step 410, and it is judged no in step 402 and 460, and then in step 490 deviation Vyd of lateral acceleration of the vehicle body is calculated without the magnitude of the lateral acceleration Gy being decreased, so that the turn behavior of the vehicle is properly presumed.

FIG. 18 (c) shows a case that lateral acceleration Gy becomes greater than presumed lateral acceleration Vr due to an abrupt increase of the lateral acceleration Gy. This phenomenon is due to an external disturbance such as a convex or concave of road surface. Since no turn behavior control is required in this case, the magnitude of the transfer acceleration Gy is not modified.

In the shown embodiment, when the judgement of step 440 is yes, i.e. when the rate of decrease of lateral acceleration Gy is greater than a predetermined threshold value, the decreasing rate ΔGy of lateral acceleration Gy is restricted in step 450. However, as an alternative, when the judgement of step 440 is yes, the time constant of the low pass filtering process in step 430 may be increased, so that the magnitude of lateral acceleration Gy does not become smaller than the magnitude of product Vr beyond a predetermined value.

Step 500 vehicle body slip angle β calculation routine (FIG. 6)

In step 510, the deviation Vyd of lateral acceleration is integrated with the time constant Ti obtained in step 330 according to the below-mentioned formula 3 so as to obtain lateral slide velocity Vy of the vehicle body, and then in step 520, it is judged if vehicle speed V is not greater than a predetermined value Vo such as 10 km/h. When the answer of step 520 is no, then in step 530 it is judged if the positive/negative sign of the lateral velocity Vy of the vehicle body is the same as the lateral acceleration Gy.

$$Vy=Vyd/(1/Ti+S) \qquad (3)$$

When the judgment of the step 520 or 530 is yes, the lateral velocity of the vehicle body is gradually decreased at each cycle of the control process according to the below-mentioned formula 4 or 5, wherein Δt is the cycle time of the general flowchart shown in FIG. 2 and ΔVy is a positive small constant value when the lateral velocity Vy is positive or a small negative constant value when Vy is negative.

$$Vy-Vy(1-\Delta t/Ti) \qquad (4)$$

$$Vy-Vy-\Delta Vy \qquad (5)$$

In step 550, slip angle β of the vehicle body is calculated as a ratio Vy/Vy of lateral slide velocity Vy to longitudinal velocity Vx (=vehicle speed V) of the vehicle body, and then in step 560 it is judged if the absolute value of slip angle β is greater than 1. If the answer of the judgement is yes, in step 570 the slip angle β is set to +1 when it is positive or to −1 when it is negative.

Thus, the vehicle body slip angle β calculation routine of step 500 correspond to a part of the above-mentioned construction 2. If it is judged in step 530 that the direction of the lateral slide velocity Vy is in contradiction to the direction of the lateral acceleration Gy of the vehicle body from the view point of dynamics, it is considered that a large error is included in the magnitude of the lateral slide velocity Vy due to errors included in the lateral acceleration Gy and the integration thereof, and therefore in step 540 the magnitude of the lateral slide velocity Vy is modified to be decreased. Thus, it is definitely avoided that the turn behavior of the vehicle is erroneously presumed due to inclusion of a large error in the magnitude of the lateral slide velocity Vy.

Step 600 yaw rate deviation Δr calculation routine (FIG. 7)

In step 610, it is judged if flag Fs is 1, and if the answer is yes, in step 620 it is judged based upon steering angle θ if the steering wheel is being turned in the turning direction. When the judgement of step 610 or 620 is no, in step 630 target yaw rate rt is calculated according to the flowchart shown in FIG. 8. If the judgment of step 620 is yes, the step 630 is bypassed, i.e. the target yaw rate rt is maintained as calculated in a preceding cycle.

In step 650, yaw rate deviation Δr between the target yaw rate rt and the actual yaw rate r is calculated, and then in step 660 it is judged if the turning condition of the vehicle is in understeer, i.e. if the absolute value of the actual yaw rate is smaller than the absolute value of the target yaw rate, and if the answer of the judgement is yes, in step 670 the yaw rate deviation Δr is clipped to +Δrc or −Δrc, wherein Δrc is a positive constant value.

The details of step 630 is shown in FIG. 8. In step 631, standard target yaw rate rto is calculated according to the below-mentioned formula 6 or 7, wherein Kh is a stability factor, and L is the wheel base.

$$rto=V\theta/(1+KhV^2)L \qquad (6)$$

$$rto=V\theta/L-KhVGy \qquad (7)$$

In step 632, it is judged if a first target yaw rate rt1 calculated in step 636 at a preceding cycle is greater than the standard target yaw rate rto and smaller than the actual yaw rate r, and if the answer is no, then in step 633 it is judged if said first target yaw rate rt1 is greater than the actual yaw rate r and smaller than the standard target yaw rate rto, and if the answer is no, then in step 634 time constant τ in the calculation of said first target yaw rate rt1 in step 636 is set to τ2. If the answer of the judgement in step 632 or 633 is yes, in step 635 the time constant τ is set to τ1 (>τ2). In step 636, said first target yaw rate rt1 is calculated according to the below-mentioned formula 8.

$$rt1=rto/(1+\tau S) \qquad (8)$$

In step 637, it is judged if a second target yaw rate rt2 calculated in step 641 in a preceding cycle is greater than said first target yaw rate rt1 and smaller than the actual yaw rate r, and if the answer is no, in step 638 it is judged if said second target yaw rate rt2 is greater than the actual yaw rate r and smaller than said first target yaw rate rt1, and if the answer is no, in step 639 time constant τ for the calculation of said second target yaw rate rt2 in step 641 is set to τ2. When the answer of judgement in step 637 or 638 is yes, in step 640 the time constant τ is set to τ1. In step 641, said second target yaw rate rt2 is calculated according to the below-mentioned formula 9.

$$rt2=rt1/(1+\tau S) \qquad (9)$$

In step 642, either said first target yaw rate rt1 calculated in step 636 or said second target yaw rate rt2 calculated in step 641 that is closer to the actual yaw rate r is made target yaw rate rt.

Thus, the steps 610 and 620 of the yaw rate deviation Δr calculation routine of step 600 correspond to a part of the above-mentioned construction 8, whereby when a confused driver turns the steering wheel in the turning direction during a turn of the vehicle, the target yaw rate rt is maintained, so that it is definitely avoided that the turn behavior control augments a spin of the vehicle.

Steps 650–670 correspond to a part of the above-mentioned construction 9, wherein it is avoided that when the magnitude of the lateral acceleration deviation Vyd as a first estimation quantity presumes occurrence of a spin, nevertheless the yaw rate deviation Δr as a second estimation quantity cancels such estimation, and thus the turn behavior of the vehicle is precisely presumed even when a confused driver turns the steering wheel in the turning direction during a turn of the vehicle.

The steps 631–642 correspond to a part of the above-mentioned construction 10, wherein in step 631 the standard target yaw rate rto is calculated as a target yaw rate obtained from steering angle θ and vehicle speed V and in step 636 the standard yaw rate is processed to incorporate a primary delay so as to obtain the first target yaw rate rt1, and in step 641 said first target yaw rate is processed to incorporate a primary delay so as to provide a second target yaw rate rt2, and then in step 642 either of said first and second target yaw rate that is closer to the actual yaw rate r is selected to provide the target yaw rate rt.

Figure 19:
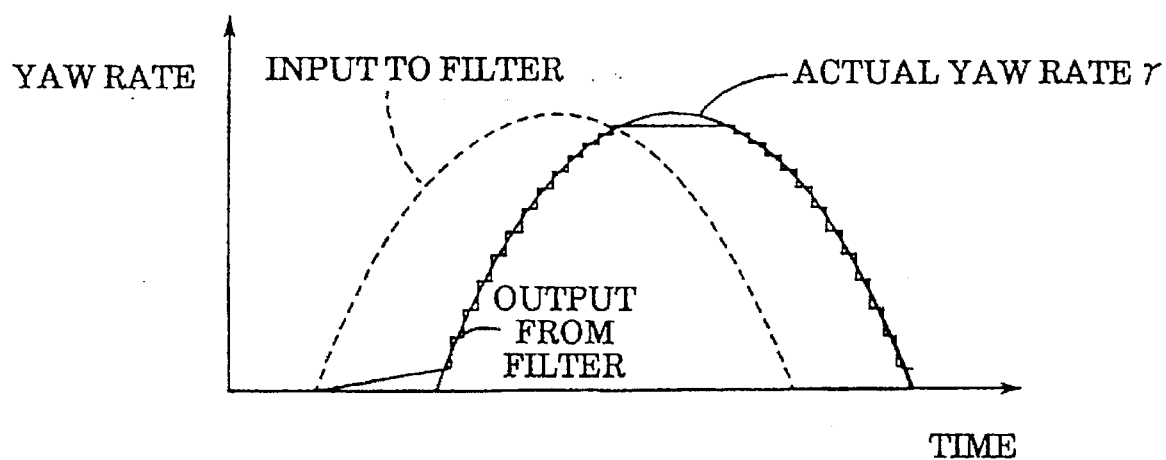
FIG. 19 is a graph showing the relation among actual yaw rate r and input and output values of the target yaw rate to and from a primary delay filter.

When it is judged in steps 632–635 and 637–640 that the target yaw rate after the primary delay process is not between the target yaw rate before the primary delay process and the actual yaw rate, the time constant τ for the primary delay process of the target yaw rate is set to a smaller value than that set when the target yaw rate after the primary delay process is between the target yaw rate before the primary delay process and the actual yaw rate, so that thereby the primary delay process of the target yaw rate is always maintained properly so as to let the actual yaw rate precisely follow the target yaw rate, as shown in FIG. 19.

Step 700 counter-steer judgment routine (FIG. 9)

In step 710, it is judged if flag Fs is 1, i.e. if the vehicle is in a spinning condition, and when the answer of the judgement is yes, in step 720 it is judged if the positive/ negative sign of steering angle θ is opposite to that of the actual yaw rate r, i.e. if the vehicle wheel is being counter-steered as being rotated in the direction opposite to the turning direction of the vehicle. If the answer of the judgement is no, in step 730 counter-steer flag Fc is reset to 0, whereas if the answer of the judgement of step 720 is yes, in step 740 flag Fc is set to 1.

Step 800 drift out judgement routine (FIG. 10)

In step 810, it is judged if flag Fs is 1, and when the answer is no, in step 820 it is judged if the absolute value of the actual yaw rate r is smaller than a product of the absolute value of the target yaw rate rt and a factor k which is a positive constant smaller than 1 such as, for example, ½, i.e. if the vehicle is in such a drift out condition that the actual yaw rate is smaller than the target yaw rate beyond such a factor k. If the answer if no, in step 830 drift out flag Fd is reset to 0, whereas if the answer is yes, flag Fd is set to 1.

Step 900 yaw rate deviation Δr weighing factor W determination routine (FIG. 11)

In step 910, weighing factor W for the yaw rate deviation Δr calculated in step 600 is set to a first weighing factor W1 close to 1 such as, for example, 0.8. In step 920, it is judged if flag Fs is 1, i.e. the vehicle is in a spinning condition, and if the answer is yes, in step 930 the weighing factor W is set to a second weighing factor W2 which is smaller than the first weighing factor W1 such as, for example, 0.6.

In step 940, it is judged if flag Fd is 1, i.e. the vehicle is in the drift out condition, and if the answer is yes, in step 950 the weighing factor W is set to a third weighing factor W3 which is smaller than the second weighing factor W2 such as, for example, 0.3. In step 960, it is judged if flag Fc is 1, i.e. the steering wheel is being counter-steered, and if the answer is yes, in step 970 the weighing factor W is set to 0. In step 980, the weighing factor W is processed by filtering so that any change thereof is smoothed.

Thus, the yaw rate deviation weighing factor determination routine of step 900 corresponds to a part of the above-mentioned construction 7, wherein when the turn behavior of the vehicle is stable and therefore the yaw rate is highly reliable, the turn behavior of the vehicle is presumed with the yaw rate deviation Δr as the second estimation quantity being weighed with a high weighing factor, whereas the turn behavior of the vehicle is unstable and therefore the yaw rate reliability is low, the turn behavior of the vehicle is presumed with the lateral acceleration deviation Vyd as the first estimation quantity being weighed with a high weighing factor, and thus the turn behavior of the vehicle is properly presumed and effectively controlled.

Step 1000 spin value SV calculation routine (FIG. 12)

In step 1005, spin value SV for the judgement and control of the behavior of the vehicle is calculated according to the below-mentioned formula 10 based upon vehicle speed V read in step 100, lateral acceleration deviation Vyd of the vehicle body calculated in step 400, slip angle β of the vehicle body calculated in step 500, yaw deviation Δr calculated in step 600, and the yaw rate deviation weighing factor W calculated in step 900.

$$SV = A(1-W)Vyd + AW\Delta rV + B\beta \qquad (10)$$

In step 1010, presumed yaw rate rhat is calculated according to the below-mentioned formula 11 based upon wheel speed VFL and VFR of left and right front vehicle wheels and tread Lt, and in step 1020 wheel speed VFL and VFR are differentiated to provide longitudinal acceleration GFL and GFR of the left and right front vehicle wheels, and then presumed longitudinal acceleration Gxhat is calculated according to the below-mentioned formula 12 which expresses a means value of the longitudinal acceleration.

$$rhat = (VFR - VFR)/Lt \qquad (11)$$

$$Gxhat = (GFR + GFL)/2 \qquad (12)$$

In step 1030, presumed yaw rate deviation Δrhat is calculated according to the below-mentioned formula 13, and in step 1040 presumed yaw rate deviation Δrhat is processed by high pass filtering, and if the high pass filtered presumed yaw rate deviation is greater than a standard value Δrho (positive constant), Δrhat is clipped to Δrho. In step 1050, presumed longitudinal acceleration deviation ΔGxhat is calculated according to the below-mentioned formula 14, and in step 1060 the presumed longitudinal acceleration deviation ΔGxhat is processed by high pass filtering, and if the high pass filtered deviation ΔGxhat is greater than a standard value ΔGxho (positive constant), ΔGxhat is clipped to ΔGxho.

$$\Delta rhat = |rhat - r| \qquad (13)$$

$$\Delta Gxhat = |Gxhat - Gx| \qquad (14)$$

In step 1070, disturbance D of road surface is calculated according to the below-mentioned formula 15 based upon vehicle speed V, presumed yaw rate deviation Δrhat calculated in steps 1030 and 1040, and presumed longitudinal acceleration deviation ΔGxhat calculated in steps 1050 and 1060, and then in step 1080 it is judged if the spin value SV calculated in step 1005 is positive, and when the answer is no, in step 1090 the spin value SV is modified by addition of disturbance compensation quantity KdD, wherein Kd is a positive factor, whereas if the answer of the judgement in step 1080 is yes, in step 1095 the spin value SV is modified by subtraction of the disturbance compensation quantity KdD.

$$D = V\Delta rhat + \Delta Gxhat \qquad (15)$$

Thus, the spin value calculation routine of step 1000 corresponds to a part of the above-mentioned constructions 11 and 12, wherein in steps 1010–1070 disturbance of road surface is calculated based upon wheel speed VFL and VFR of left and right front vehicle wheels, and in steps 1080–1095 the spin value SV is modified according to the disturbance, and thus the turn behavior of the vehicle is correctly presumed even when the lateral acceleration Gy, etc. are affected by convex or concave or the like of road surface.

Figure 13:
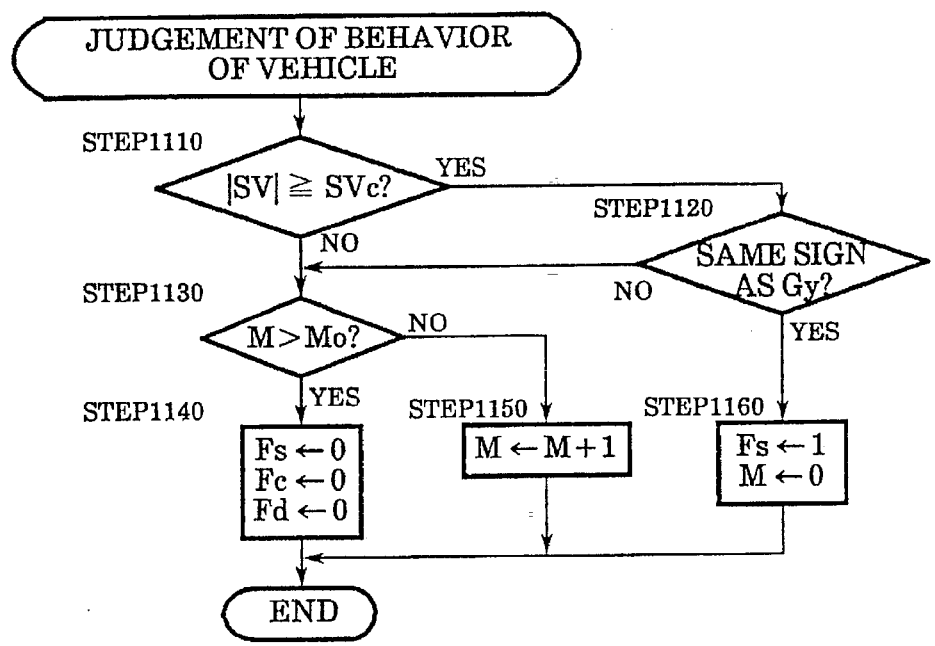
FIG. 13 is a flowchart showing the behavior judgement routine of step 1100 in the general flowchart shown in FIG. 2.

Step 1100 vehicle behavior judgement routine (FIG. 13)

In step 1110, it is judged if the absolute value of spin value SV is equal to or greater than a standard value SVc (positive constant), and if the answer is yes, in step 1120 it is judged if the positive/negative sign of spin value SV is different from that of lateral acceleration Gy. When the answer of the judgment of 1110 or 1120 is no, in step 1130 it is judged if counter number M of a counter is greater than a standard value Mo (positive constant), and if the answer is yes, in step 1140 flag Fs of spin, flag Fc of counter-steer and flag Fd of drift out are all be set to 0, whereas when the answer of the judgement in step 1130 is no, the count value M of the counter is increased by 1. When the answer of the judgement in step 1120 is yes, i.e. when it is judged that the vehicle is spinning, in step 1160 flag Fs of spin is set to 1, and count value M of the counter is reset to 0.

Thus, in the vehicle behavior judgement routine of step 1100, unless the spin value SV increases so much as to be equal to or greater than the standard value SVc, flag Fs is not set to 1, and therefore it is definitely avoided that an unnecessary behavior control is executed. Further, when the spin value SV decreases not to be greater than the standard value SVc, until the count value M of the counter increases beyond the standard value Mo, flag Fs is maintained at 1, and therefore the behavior control is definitely continued until the turn behavior of the vehicle becomes stable.

Step 1200 vehicle behavior control execution routine (FIG. 14)

Figure 17:
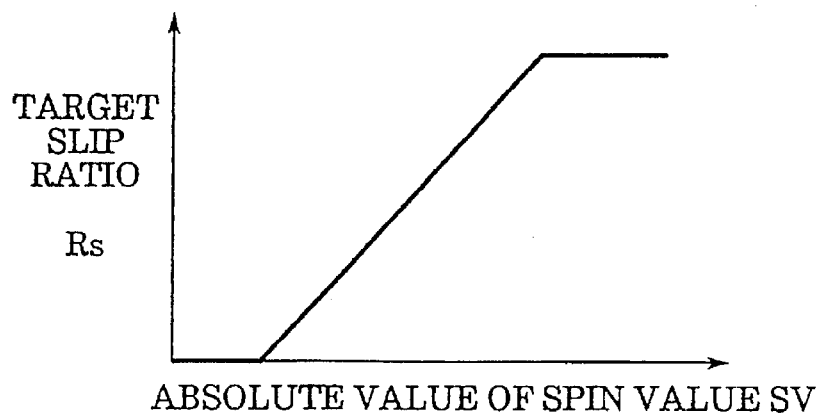
FIG. 17 is a graph showing the relation between the absolute value of spin value SV and the target slip ratio Rs.

In step 1210, the vehicle wheel of which the braking force is controlled according to the spin value is specified to be the front vehicle wheel at the outside of a turn, i.e., to be the right front vehicle wheel when the spin value SV is positive, or to be the left front vehicle wheel when the spin value SV is negative. In step 1220, target slip ratio Rs for the left front vehicle wheel or the right front vehicle wheel is calculated based upon the absolute value of spin value SV according to a map corresponding to a graph shown in FIG. 17. Then in step 1230, target wheel speed Vwt is calculated according to the below-mentioned formula 16, wherein Kw is a factor, and then in step 1240 wheel speed deviation $\Delta$Vw between the target wheel speed Vwt and the vehicle speed Vw detected by the wheel speed sensor 64FL or 64FR, i.e. VFL or VFR, is calculated.

$$Vwt=KwV(1-Rs/100) \tag{16}$$

In step 1250, it is judged if the absolute value of vehicle speed deviation $\Delta$Vw is greater than a standard value Vwo (positive constant), and if the answer is no, in step 1260 the vehicle speed deviation $\Delta$Vw is reset to 0. When the answer of step 1250 is yes, the resetting process of step 1260 is bypassed. In step 1270, the braking force applied to the control vehicle wheel is controlled according to the wheel speed deviation $\Delta$Vw. In more detail, when the spin value SV is positive, the control valve 40FR and the on-off valves 44FR and 46FR for the right front vehicle wheel operating at the outside of the turn are controlled according to the respective duty ratios corresponding to the magnitude of wheel speed deviation $\Delta$Vw, whereas when the spin value SV is negative, the control valve 40FL and the on-off valves 44FL and 46FL for the left front vehicle wheel are controlled according to the respective duty ratios corresponding to the magnitude of vehicle speed deviation $\Delta$Vw, such that the wheel speed deviation $\Delta$Vw is in a range of $-$Vwo+Vwo according to a feed back control manner, whereby an anti spin moment is generated by the deviation between the braking forces applied to the front vehicle wheels at the outside and the inside of the turn, so as thereby to decrease the spin.

Figure 20:
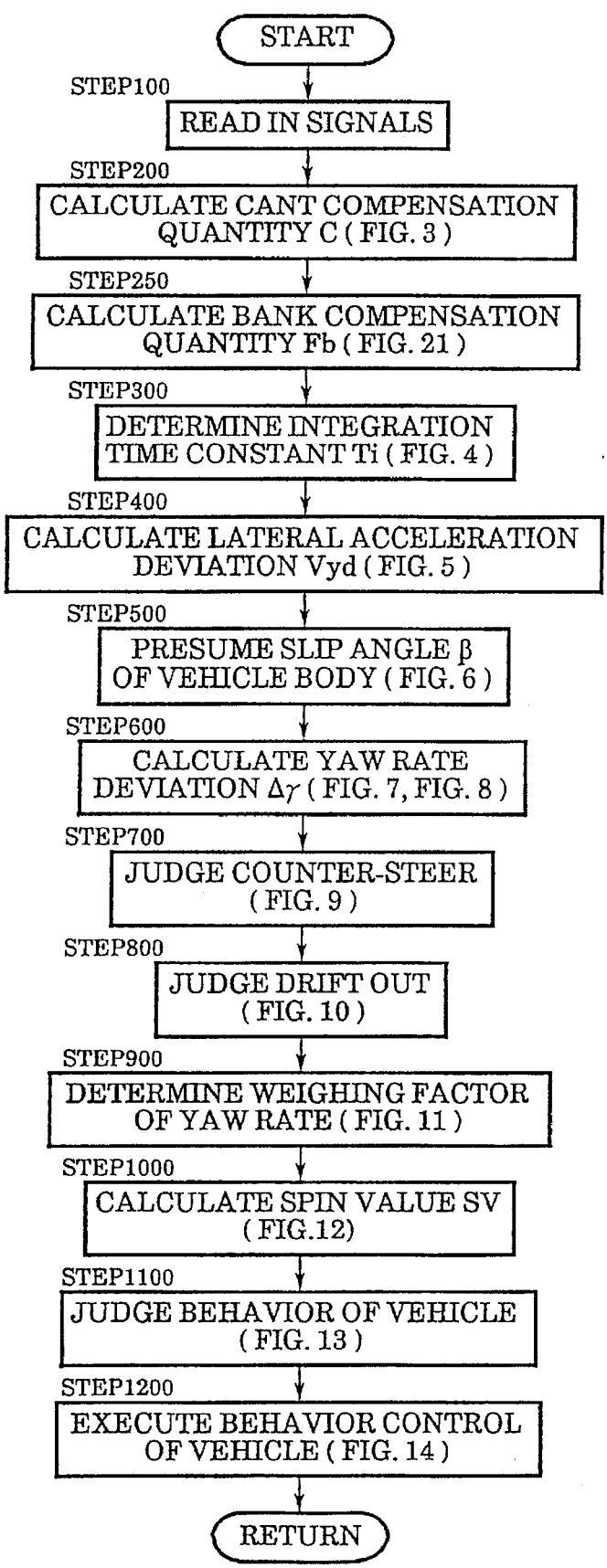
FIG. 20 is a general flowchart showing the behavior control according to a second embodiment of the behavior control device of the present invention.

FIG. 20 is a general flowchart showing the behavior control by a second embodiment of the behavior control device of the present invention. In FIG. 20, the steps corresponding to those in FIG. 2 are designated by the same step numbers as in FIG. 2.

Figure 23:
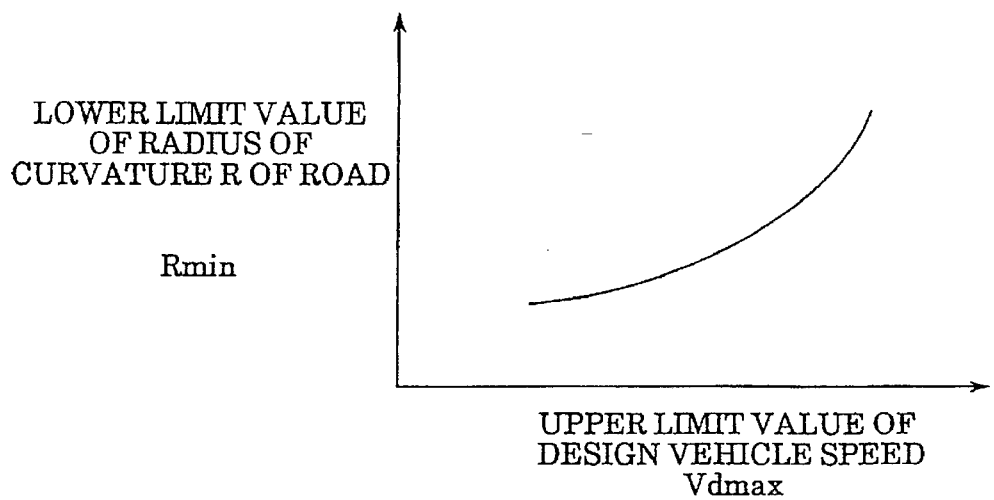
FIG. 23 is a graph showing the relation between the lower limit value Rmin of the radius of curvature of road and the upper limit value Vdmax of the design vehicle speed.

Generally with respect to a curved portion of a highway, a design vehicle speed Vd and a bank angle $\phi$b are determined according to the radius of curvature R of the curved portion by a pertinent regulation, and in this connection there is, for example, a relation such as shown in FIG. 23 between the lower limit Rmin of the radius of curvature and the upper limit Vdmax of the design vehicle speed, and therefore the bak angle $\phi$b of the road surface is obtained according to an approximation such as expressed by the below-mentioned formula 17, wherein Kb is an appropriate constant. When a vehicle runs along a curved portion of a road having a certain bank angle, the vehicle body is applied with a lateral force due to the bank angle, and therefore in the calculation of the lateral acceleration deviation Vyd in the above-mentioned step 400, it is desirable that lateral force due to the bank angle, i.e. bank compensation quantity Fb, is taken into consideration.

$$\phi b=KbVd^2/R \tag{17}$$

Figure 24:
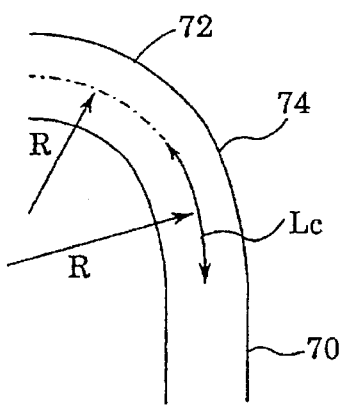
FIG. 24 is an illustration of a curved portion of road.

On the other hand, when the driver takes an action to suppress a spin, if the magnitude of yaw rate r is used for the calculation of the radius of curvature of the road with no modification, the radius of curvature will be calculated to be too small. Therefore, it is desirable that a restriction is applied to the change rate of the detected yaw rate based upon the length Lc of a transient region 74 which is provided between the straight portion 70 and the curved portion 72 according to the regulation, as shown in FIG. 24.

The length Lc of the transient region is proportional to the design vehicle speed Vd, and is expressed by the below-mentioned formula 18, wherein Cd is a proportional constant. Yaw rate r is expressed by the below-mentioned formula 19. Therefore, change rate rd of the yaw rate of the vehicle body in the transient region is expressed by the below-mentioned formula 20.

$$Lc=CdVd \tag{18}$$

$$r=V/R \tag{19}$$

$$rd=V^2/(RCdVd) \tag{20}$$

Figure 21:
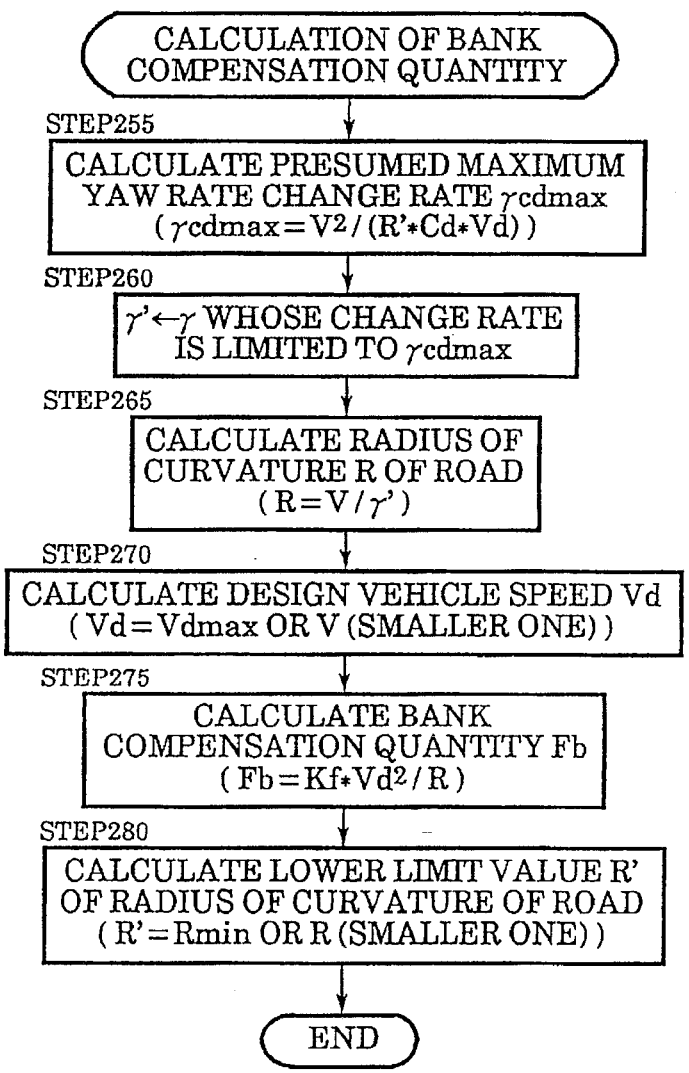
FIG. 21 is a flowchart showing the bank compensation quantity calculation routine of step 250 in the general flowchart shown in FIG. 20.
Figure 22:
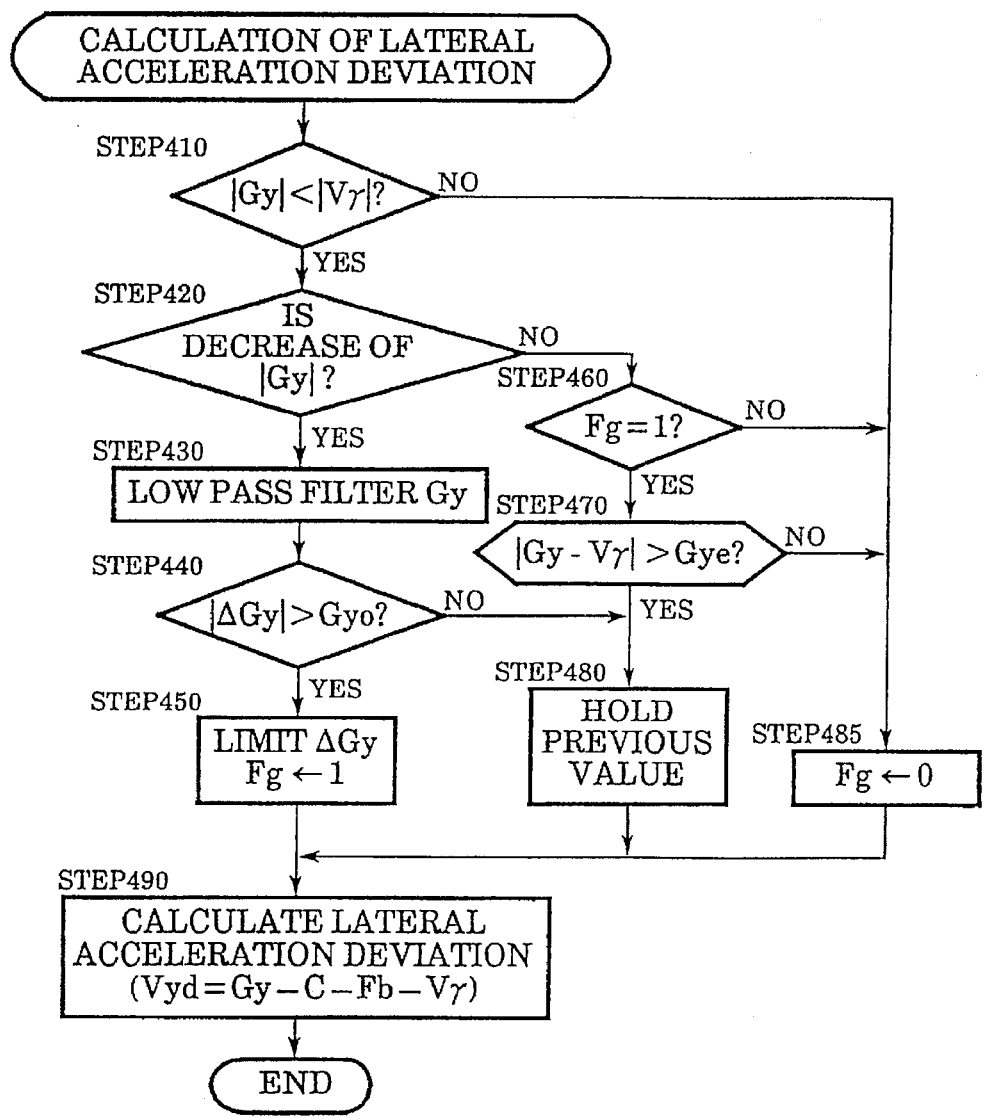
FIG. 22 is a flowchart showing the lateral acceleration deviation calculation routine of step 400 in the general flowchart shown in FIG. 20.

In this embodiment, subsequent to the cant compensation quantity calculation routine of step 200, in step 250 a bank compensation quantity Fb calculation routine is executed according to the flowchart shown in FIG. 21. Further, in step 490 of the lateral acceleration deviation calculation routine of step 400, as shown in FIG. 22 the lateral acceleration deviation Vyd is calculated according to the below-mentioned formula 21 so that the lateral acceleration deviation Vyd is compensated for the lateral force Fb due to the bank angle of road surface.

$$Vyd=Gy-C-Fb-Vr \tag{21}$$

As shown in FIG. 21, in step 255, presumed maximum change rate of yaw rate, rcdmax, is calculated based upon vehicle speed V, lower limit of the radius of curvature of road (R') calculated in step 280 in a preceding cycle, coefficient Cd in the above-mentioned formula 18, and design vehicle speed Vd calculated in step 270 of a preceding cycle according to the below-mentioned formula 22, and then in step 260 the raw yaw rate r' of the vehicle body for the calculation of radius of curvature R of the road in step 265 is set to such a value that the change rate of yaw rate is limited to the presumed maximum change rate of yaw rate rcdmax, and then in step 265 the radius of curvature R of the road is calculated according to the below-mentioned formula 23.

$$rcdmax=V^2/(R'CdVd) \tag{22}$$

$$R=V/r' \tag{23}$$

In step 270, upper limit Vdmax of the design vehicle speed is obtained from a map according to the graph of FIG. 23 based upon the radius of curvature of the road calculated in step 265, and smaller one of the upper limit Vdmax and the vehicle speed V is selected as the design vehicle speed Vd, and then in step 275 the bank compensation quantity Fb is calculated according to the below-mentioned formula 24, wherein Kf is a proportional constant, and then in step 280 lower limit value Rmin of the radius of curvature of the road surface is obtained from the design vehicle speed Vd calculated in step 270 and the map corresponding to the graph shown in FIG. 23, and a smaller one of the lower limit value Rmin and the radius of curvature R calculated in step 265 is selected as the lower limit value R' of the radius of curvature of the road used for the calculation of step 255.

$$Fb = Kf V d^2/R \qquad (24)$$

Thus, step 250 of the second embodiment corresponds to a part of the above-mentioned construction 6, wherein the lateral acceleration Gy of the vehicle body is modified by the lateral force Fb due to the bank angle of a curved portion of road, whereby the lateral acceleration deviation Vyd is correctly calculated regardless of the bank angle, so that the slip angle $\beta$ of the vehicle body is correctly calculated and the turn behavior of the vehicle is correctly presumed.

Figure 25:
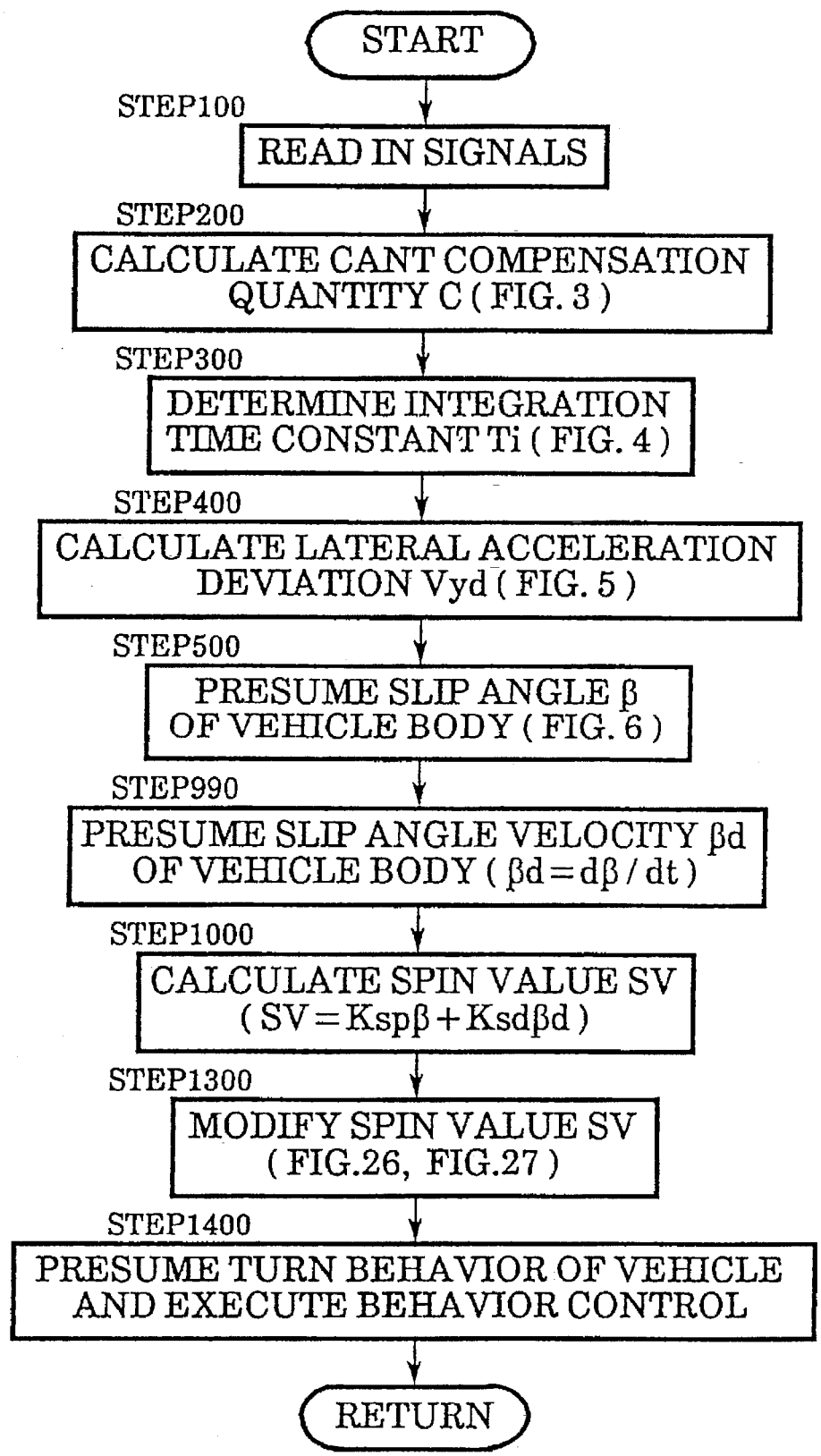
FIG. 25 is a general flowchart showing the behavior control according to a third embodiment of the behavior control device of the present invention.

FIG. 25 is a general flowchart showing the behavior control by a third embodiment of the behavior control device of the present invention. In FIG. 25 the steps corresponding to those shown in FIG. 2 are designated by the same step numbers. Although not shown in the figure, the microcomputer in this embodiment is supplied with a signal expressing throttle opening G detected by a throttle position sensor.

Figure 26:
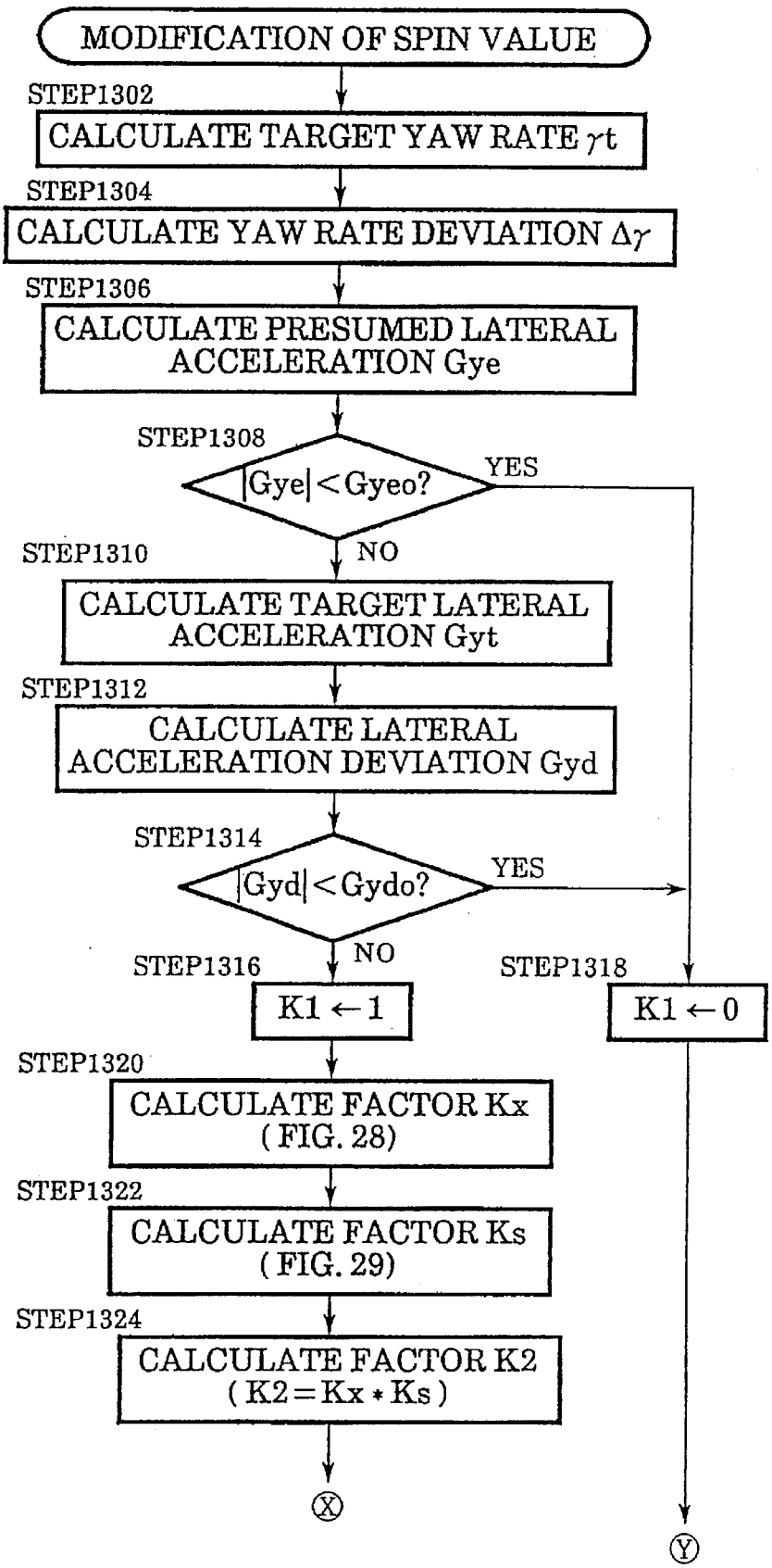
FIG. 26 is a flowchart showing a part of the spin value compensation routine of step 1300 in the general flowchart shown in FIG. 25.
Figure 27:
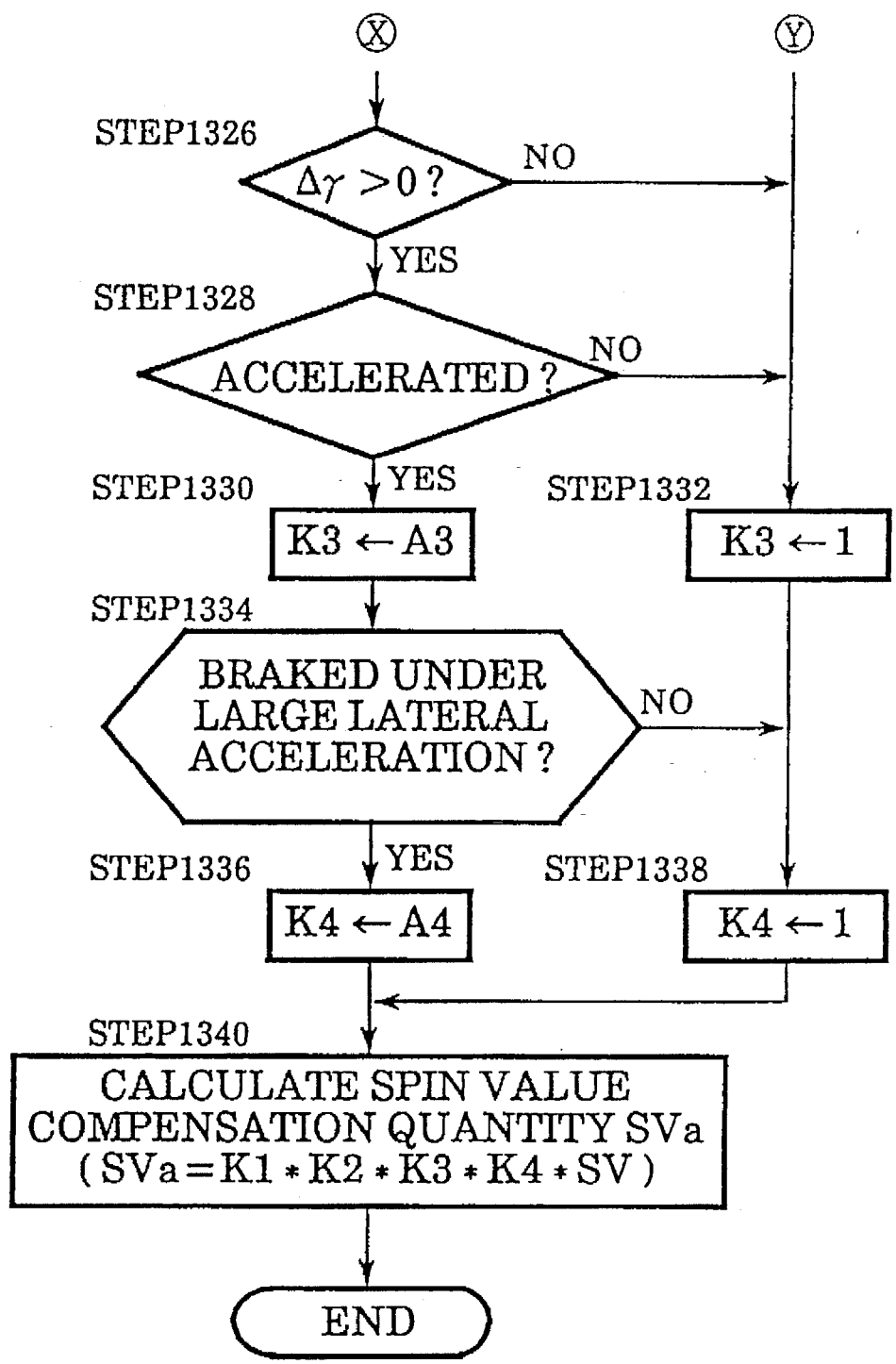
FIG. 27 is a flowchart showing the remaining part of the spin value compensation routine of step 1300 in the general flowchart shown in FIG. 25.

In this embodiment, steps 100–500 are executed in the same manner as in the first embodiment, except that in steps 200 and 300 the time constant Tc and the integration time duration Ti for the calculation of the cant compensation quantity C are calculated based upon the absolute value of modified spin value SVa calculated in the below-mentioned step 1300, and then in step 990 slip angle velocity $\beta d$ of the vehicle body is calculated according to the below-mentioned formula 25, and then in step 1000 spin value SV is calculated according to the below-mentioned formula 26, wherein Ksp and Kst are factors, then in step 1300 the modified spin value SVa is calculated according to the routines shown in FIGS. 26 and 27, and then in step 1400 the turn behavior of the vehicle is presumed and controlled by the prosecution of the same routine as steps 1210–1270 of the first embodiment based upon the modified spin value SVa.

$$\beta d = d\beta/dt \qquad (25)$$

$$SV = Ksp\beta + Ksd\beta d \qquad (26)$$

Next, referring to the flowchart shown in FIGS. 26 and 27, the spin value modification routine will be described.

First, in step 1302, target yaw rate rt is calculated according to the below-mentioned formula 27 corresponding to the afore-mentioned formula 6 based upon vehicle speed V and steering angle $\theta$ read in step 100, then in step 1304 yaw rate deviation $\Delta r$ (=rt−r) between the target yaw rate rt and actual yaw rate r is calculated, and then in step 1306 presumed lateral acceleration Gye is calculated according to the below-mentioned formula 28. Then in step 1308, it is judged if the absolute value of the lateral acceleration Gye is smaller than a threshold value Gyeo (positive constant), and if the answer is no, the control proceeds to step 1310, whereas if the answer is yes, the control proceeds to step 1318 and factor K1 is reset to 0.

$$rt = V\theta/(1+KhV^2)L \qquad (27)$$

$$Gye = \Delta r/F \qquad (28)$$

In step 1310, target lateral acceleration Gyt is calculated according to the below-mentioned formula 29, wherein N is steering gear ratio, L is wheel base and Kh is a stability factor, and then in step 1312 lateral acceleration deviation Gye (=Gyt−Gy) between the target lateral acceleration Gyd and actual lateral acceleration Gy is calculated. Then in step 1314, it is judged if the absolute value of the lateral acceleration deviation Gyd is smaller than a threshold value Gydo (positive constant), and if the answer is no, in step 1316 factor K1 is set to 1, whereas if the answer is yes, in step 1318 factor K1 is reset to 0.

$$Gyd = V^2\theta/NL(1+KhV^2) \qquad (29)$$

Figure 28:
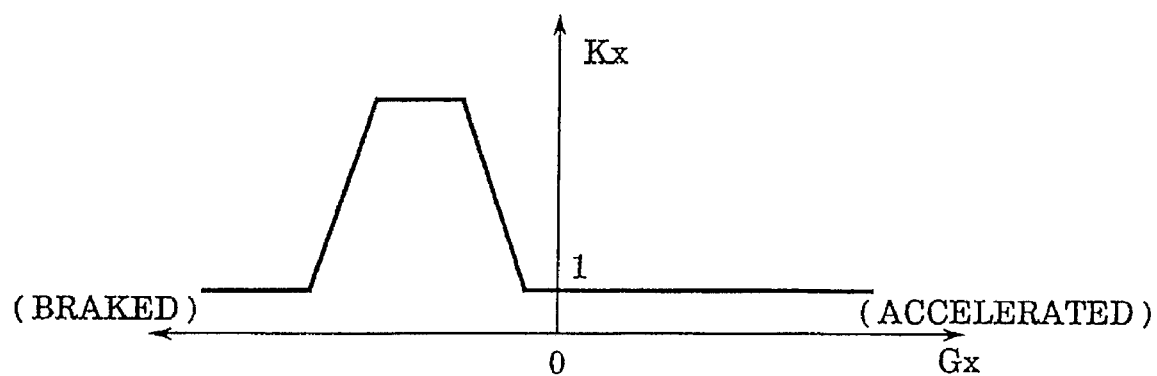
FIG. 28 is a graph showing the relation between longitudinal acceleration Gx and factor Kx.
Figure 29:
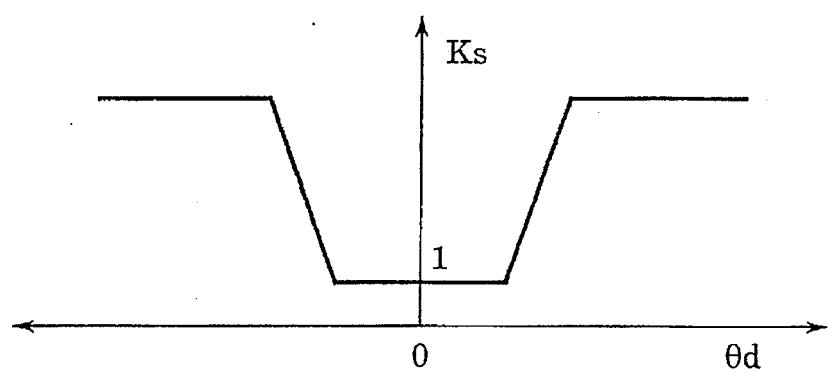
FIG. 29 is a graph showing the relation between steering angle velocity θd and factor Ks.
Figure 30:
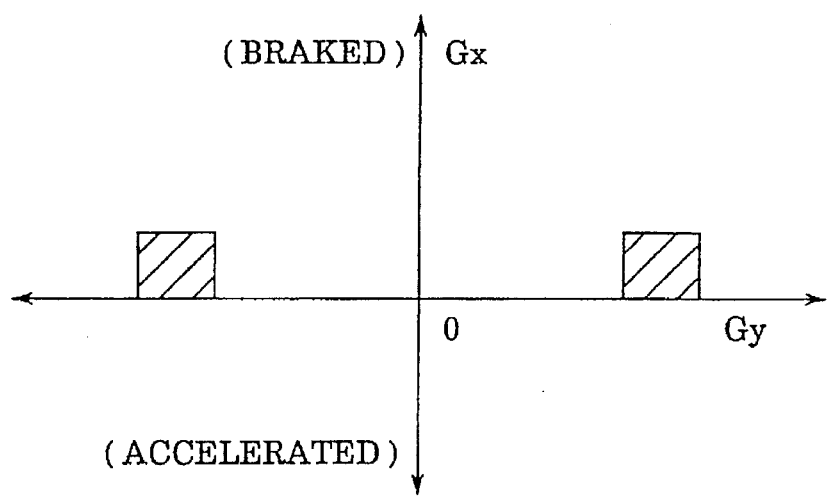
FIG. 30 is a graph showing regions of large lateral acceleration braking condition in a coordinate of the abscissa representing lateral acceleration Gy and the ordinate representing longitudinal acceleration.

In step 1320, factor Kx is calculated according to a map corresponding to a graph shown in FIG. 28, then in step 1322 the steering angle $\theta$ is differentiated to provide steering angle velocity $\theta d$, and then factor Ks is calculated according to a map corresponding to a graph shown in FIG. 29, and then in step 1324 factor K2 is calculated as a product of the factors Kx and Ks.

In step 1326, it is judged if a drift out of the vehicle has occurred based upon the yaw rate deviation $\Delta r$ calculated in step 1304, and if the answer is yes, in step 1328 it is judged if the acceleration pedal is stepped on, and if the answer is yes, in step 1330 factor K3 is set to A3 (>1). If the answer of step 1326 or 1328 is no, in step 1332 factor K3 is set to 1. The judgement about if the acceleration pedal is stepped on may be made such, expressing throttle opening speed or differentiation of throttle opening $\delta$ by $\delta d$ and appropriately determining factors such as Kap and Kat, as to judge if Kap$\delta$+Kad$\delta d$ is greater than a standard value $\delta o$.

In step 1334, it is judged if a large lateral acceleration is being controlled, i.e. if the vehicle is in a condition shown by the hatched areas in FIG. 13, and if the answer is yes, then in step 336 factor K4 is set to A4 (>1), whereas if the answer is no, then in step 1338 factor K4 is set to 1. In step 1340, modified spin value SVa is calculated according to the below-mentioned formula 30.

$$SVa = K1.K2.K3.K4.SV \qquad (30)$$

Thus, steps 1302–1318 of the third embodiment correspond to a part of the above-mentioned construction 14, wherein in step 1302 the target yaw rate rt is calculated based upon the steering angle $\theta$ and the vehicle speed V, then in step 1304 the yaw rate deviation $\Delta r$ between the target yaw rate rt and actual yaw rate r is calculated, then in step 1306 presumed lateral acceleration Gye is calculated based upon the deviation $\Delta r$, and then in step 1308 it is judged if the presumed lateral acceleration Gye is not greater than a threshold value so as to judge if the deviation between the target yaw rate rt and the actual yaw rate r is smaller than a predetermined threshold value. In step 1310, the target lateral acceleration Gyt is calculated from the steering angle $\theta$ and the vehicle speed V, then in step 1312 the deviation Gyt between the target lateral acceleration Gyt and the actual lateral acceleration Gy is calculated, and then in step 1314 it is judged if the deviation between the target lateral acceleration Gyt and the lateral acceleration Gy is smaller than a predetermined threshold value.

Then, when the deviation of yaw rate or lateral acceleration is smaller than the predetermined threshold value, in step 1318 the factor K1 is reset to 0, whereby the modified spin value SVa is calculated to be 0, so that the control of the turn behavior is definitely prevented. By this arrangement, even when the spin value SV becomes large due to some external disturbances, it is definitely avoided that the turn behavior of the vehicle is erroneously controlled.

Steps 1320–1340 of this embodiment correspond to a part of the above-mentioned construction 15, wherein in step 1320–1324 it is judged if the vehicle is in a first condition that it is braked during a turn, and if such a first condition is detected, the factors K2 and K4 are set to values greater than 1. And if in steps 1320–1328 it is detected that the vehicle is in a second condition that it is accelerated in an under-steer condition, and if such a second condition is detected, the factor K3 is set to a value greater than 1.

Therefore, if the first or second condition is detected, i.e. if it is detected that the vehicle is highly apt to make a spin, the modified spin value SVa is calculated to be a high value, and thereby the behavior control is started immediately when a spin occurs, so that the turn behavior of the vehicle is effectively controlled. When neither the first condition nor the second condition is detected, i.e. when the probability of the vehicle making a spin is low, the modified spin value SVa is calculated to be a low value, and thereby the behavior control is suppressed, and thus it is avoided that a turn behavior of the vehicle is erroneously executed in a condition that the vehicle is stable.

Figure 31:
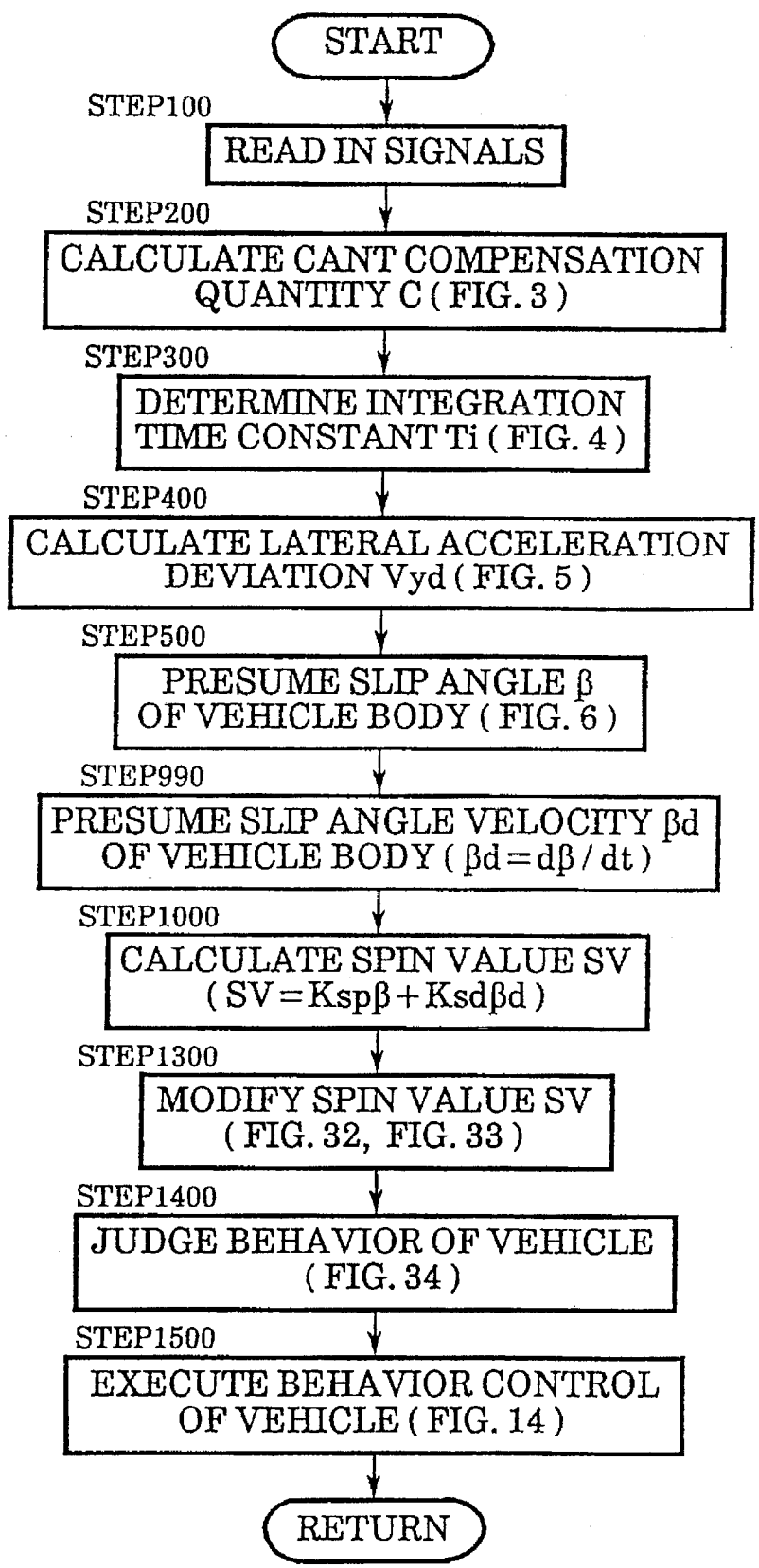
FIG. 31 is a general flowchart showing the behavior control according to a modification of the third embodiment.

FIG. 31 shows a general flowchart of the behavior control by a modification of the third embodiment. In FIG. 31, the steps corresponding to those in FIGS. 2 and 25 are designated by the same step numbers as in those figures.

Figure 32:
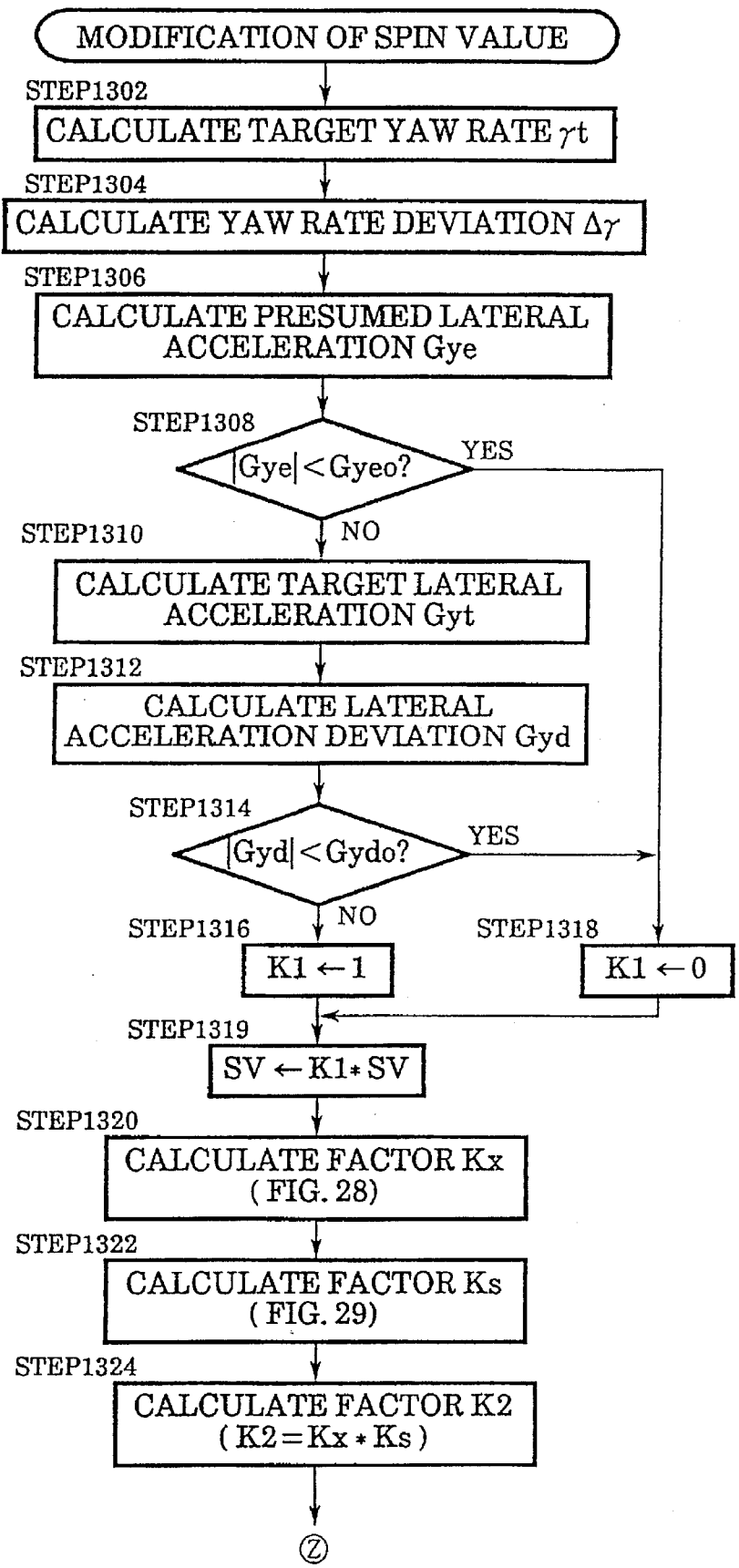
FIG. 32 is a flowchart showing a part of the spin value modification routine of step 1300 in the general flowchart shown in FIG. 31.
Figure 33:
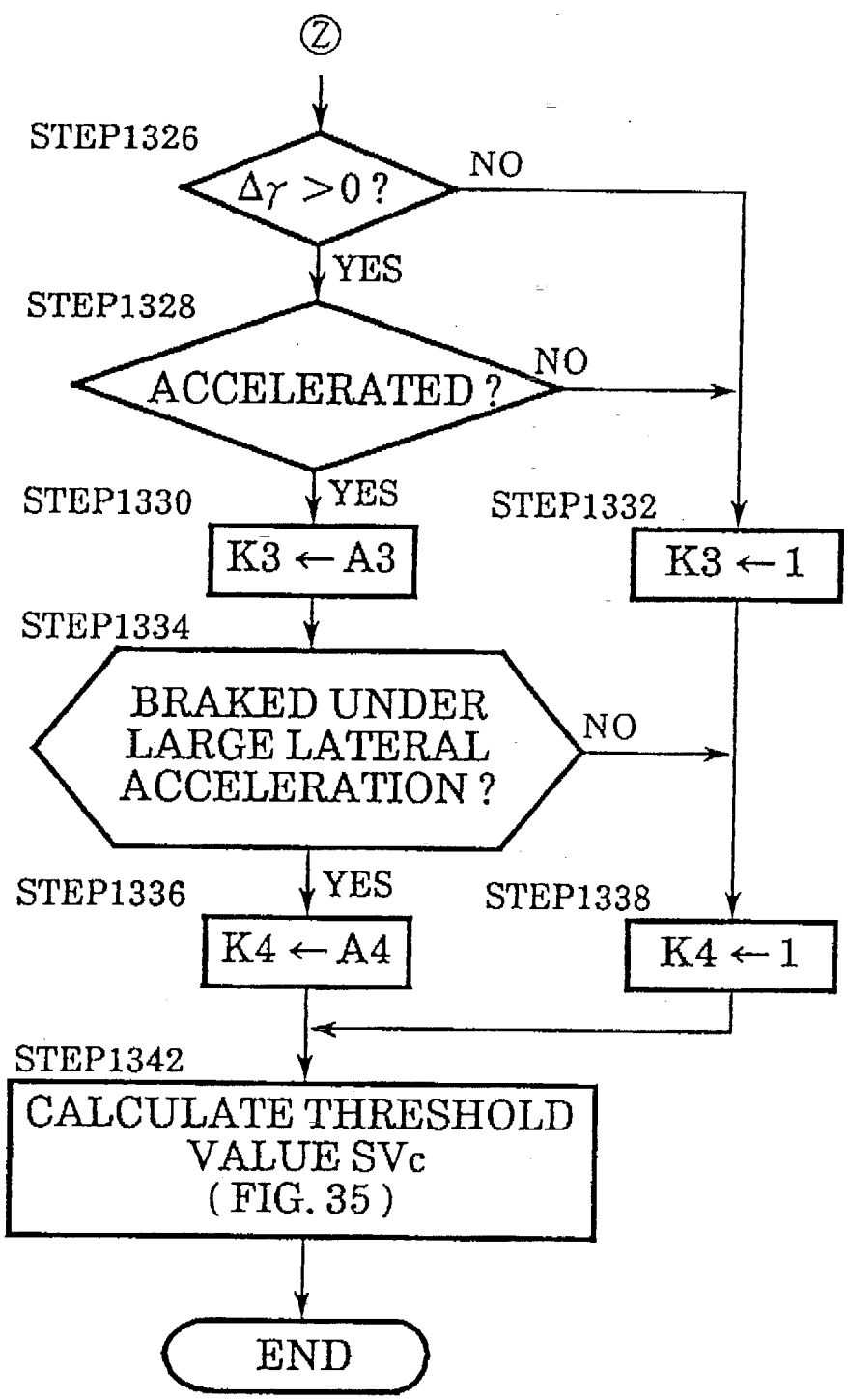
FIG. 33 is a flowchart showing the remaining part of the spin value modification routine of step 1300 in the general flowchart shown in FIG. 31.
Figure 34:
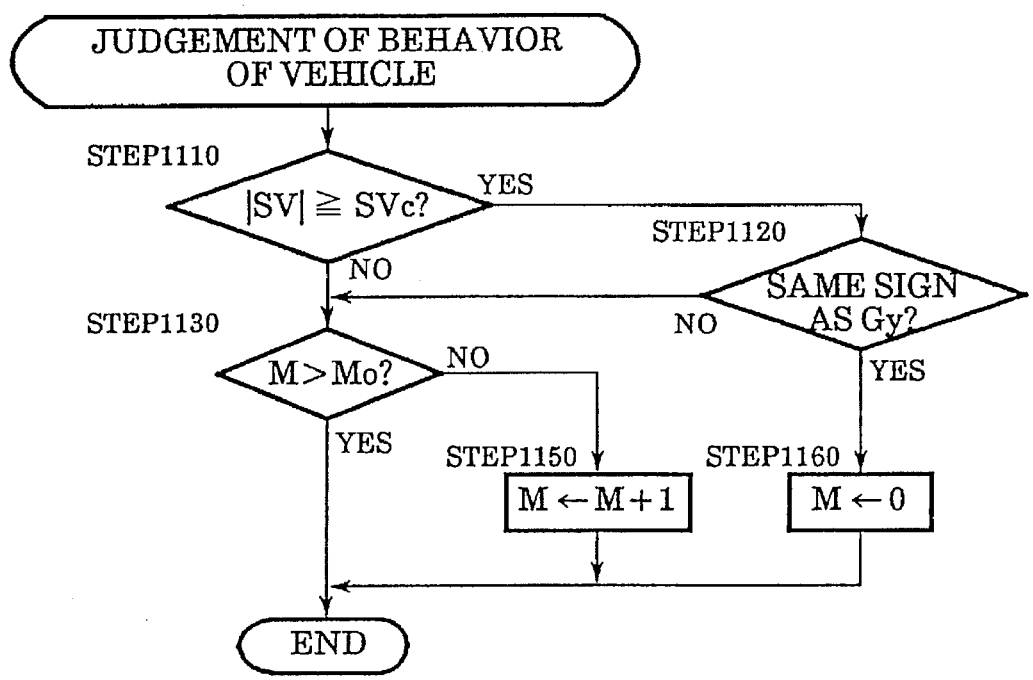
FIG. 34 is a flowchart showing the vehicle behavior judgement routine of step 1400 in the general flowchart shown in FIG. 31.

In this modification, in step 1300 the spin value SV is modified according to the routine shown FIGS. 32 and 33, then in step 1400 the turn behavior of the vehicle is presumed based upon the modified spin value SV according to the routine shown in FIG. 34, and then in step 1500 the behavior control is executed according to the same routine as steps 1210–1270 of the first embodiment based upon the modified spin value SV.

Figure 35:
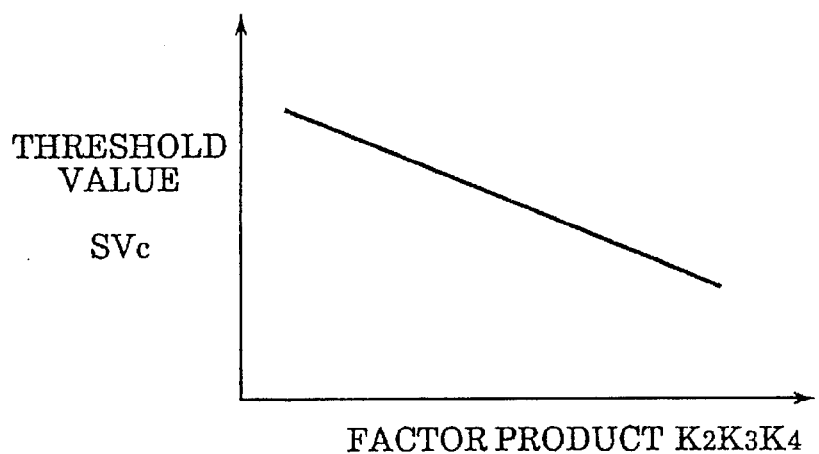
FIG. 35 is a graph showing the relation between the threshold value SVc and the product K2.K3.K4.

Steps 1302–1318 of the spin value modification routine shown in FIG. 32 are executed in the same manner as in the third embodiment, but in step 1319 the spin value SV calculated in step 1000 is multiplied by factor K1. Further, steps 1320–1338 of the spin value modification routine of FIG. 33 are executed in the same manner as those in the third embodiment, but in step 1342 the threshold value SVc for the behavior judgement in step 1400 is calculated according to a map corresponding to a graph shown in FIG. 35 based upon a factors product K2.K3.K4. The behavior judgement routine shown in FIG. 34 is executed in the same manner as the behavior judgement routine of the first embodiment, except that the flags Fs, Fc and Fd are not set.

Thus, in this modification, when the deviation of yaw rate or the deviation of lateral acceleration is smaller than a predetermined threshold value, in step 1318 the factor K1 is reset to 0, so that the spin value SV is modified to zero, and thereby the turn behavior control is definitely prevented, and therefore, even when the spin value SV increases to a high value due to some external disturbances, it is definitely avoided that the behavior control of the vehicle is erroneously executed. In the first condition that the vehicle is braked during turn, the factors K2 and K4 are set to a value greater than 1, and when the vehicle is in the second condition that it is accelerated in under-steer condition, the factor K3 is set to a value greater than 1, and therefore the threshold value SVc is set to a smaller value as the product K2.K3.K4 is greater.

Therefore, when the first or the second condition is detected, showing that the vehicle is highly liable to make a spin, the threshold value SVc is made smaller, so that the behavior control is less active, and therefore, as is in the third embodiment, the behavior control is immediately started when a spin occurs, so that the turn behavior of the vehicle is effectively controlled. When neither the first condition nor the second condition is detected, i.e. when the vehicle is in the condition less liable to make a spin, the behavior control is made less active, and thereby it is avoided that the behavior control is erroneously executed when the turn behavior of the vehicle is stable.

As will be apparent from the foregoing descriptions, according to device of the above-mentioned construction 1, when the turn behavior of the vehicle is stable, accumulation of errors is decreased, so that it is prevented that the turn behavior of the vehicle is erroneously presumed due to accumulation of errors, while on the other hand when the turn behavior of the vehicle is unstable so that the problem of the accumulation of errors is of a secondary importance but the turn behavior of the vehicle needs to be stabilized quickly, the integration time constant is set longer so that the lateral velocity Vy is definitely obtained and the unstable turn behavior of the vehicle is thereby definitely and effectively controlled.

According to the device of the above-mentioned construction 2, when the direction of the lateral slide velocity Vy is in contradiction to the direction of other parameter of the vehicle from the view point of dynamics, i.e. when a large error has occurred in the lateral slide velocity Vy due to errors and integration thereof included in the lateral acceleration Gy of the vehicle body, the magnitude of the lateral slide velocity Vy is modified to be decreased, whereby it is definitely avoided that the turn behavior of the vehicle is erroneously presumed due to inclusion of a large error in the lateral slide velocity Vy.

According to the device of the above-mentioned construction 3, a cant compensation quantity is calculated by low pass filtering deviation Gy-Vr, and the turn behavior of the vehicle is presumed based upon the modified lateral acceleration Gya generated by modifying the lateral acceleration Gy by the cant compensation quantity, whereby the lateral acceleration due to a turn of the vehicle is correctly calculated regardless of any cant of road surface, and thereby the turn behavior of the vehicle is correctly presumed and controlled.

According to the device of the above-mentioned construction 4, when the lateral slide velocity Vy is increased due to the modification by the cant compensation quantity in the condition where a spin of the vehicle is presumed, the cant compensation quantity is modified to zero, whereby it is definitely avoided that the condition of the vehicle is erroneously presumed as a spin has occurred due to the modification of the lateral acceleration Gy by the cant compensation quantity even though no spin has occurred.

According to the device of the above-mentioned construction 5, when the absolute value of Gy is smaller than the absolute value of Vr and the absolute value of Gy is decreasing, the change rate of the lateral acceleration Gy in the calculation of lateral slide velocity Vy is modified to be decreased, whereby the probability of presuming the turn behavior of the vehicle erroneously due to external disturbances of road surface is decreased.

According to the device of the above-mentioned construction 6, the radius of curvature of road is obtained, then a bank angle of road surface is presumed based upon the radius of curvature, then the lateral acceleration Gy is modified according to the presumed bank angle, and then the turn behavior of the vehicle is presumed based upon the modified lateral acceleration, whereby the lateral acceleration Gy is modified according to the bank angle when the vehicle turns along a road having a bank angle, so that thereby the turn behavior of the vehicle is correctly presumed and controlled. According to the device of the above-mentioned construction 7, when a stable turn behavior of the vehicle is presumed, the second estimation quantity is weighed with a higher weighing factor, while when an unstable turn behavior of the vehicle is presumed, the first estimation quantity is weighed with a higher weighing factor, whereby when the turn behavior of the vehicle is stable, the turn behavior of the vehicle is presumed with the second estimation quantity expressing the yaw rate deviation Δr being weighed higher, while when the turn behavior of the vehicle is unstable, the turn behavior of the vehicle is presumed with the first estimation quantity based upon the lateral acceleration Gy or the like being weighed higher, whereby the turn behavior of the vehicle is properly presumed and effectively controlled.

According to the device of the above-mentioned construction 8, the means for calculating the second estimation quantity calculates the target yaw rate at a predetermined cycle, and when steering angle θ is being increased in the condition that a spin is presumed by the behavior presuming means, the second estimation quantity is calculated with the current target yaw rate being replaced by the target yaw rate at a preceding cycle, whereby even when a confused driver turns the steering wheel in the direction of the turn during the turn of the vehicle, the turn behavior of the vehicle is correctly presumed, whereby the turn behavior of the vehicle is correctly presumed and it is definitely avoided that the turn behavior of the vehicle is controlled toward augmentation of the spin by the behavior control device.

According to the device of the above-mentioned construction 9, when the actual yaw rate is smaller than the target yaw rate, the second estimation quantity is limited not to be greater than a predetermined value, whereby it is definitely avoided that the second estimation quantity is cancelled in spite of the fact that the first estimation quantity presumes a spin of the vehicle, and thereby even when a confused driver turns the steering wheel in the direction opposite to the turning direction of the vehicle, the turn behavior of the vehicle is correctly presumed and controlled.

According to the device of the above-mentioned construction 10, the target yaw rate obtained from steering angle θ and vehicle speed V is processed to incorporate a primary delay, and when the target yaw rate after the primary delay process is not between the target yaw rate before the primary delay process and the actual yaw rate, the time constant of the primary delay process is set smaller than in the case when the target yaw rate after the primary delay process is between the target yaw rate before the primary process and the actual yaw rate, whereby the target yaw rate is changed to correspond to the yaw rate to be generated in accordance with steering angle and vehicle speed, and thereby the turn behavior of the vehicle is properly presumed and controlled.

According to the device of the above-mentioned construction 11, presumed yaw rate rhat of the vehicle body is calculated based upon the wheel speed of left and right front vehicle wheels, then presumed longitudinal acceleration Gxhat is calculated based upon the wheel speed of the left and right front vehicle wheels, then external disturbances of road surface are presumed based upon the deviation between the actual yaw rate r and the presumed yaw rate rhat and the deviation between the actual longitudinal acceleration Gx and the presumed longitudinal acceleration Gxhat, and then the control amount is modified according to the level of the external disturbances of road surface, whereby the turn behavior of the vehicle is correctly presumed and controlled even when the lateral acceleration Gy, etc. are affected by the road condition.

According to the device of the above-mentioned construction 12, the control amount is modified by modifying the final estimation quantity according to the level of external disturbances of road surface, and according to the device of the above-mentioned construction 13, when the final estimation quantity exceeds a threshold value, the turn behavior of the vehicle is controlled by the control amount according to the final estimation quantity, whereby the control amount is modified by modifying the threshold value according to the level of the external disturbances of the road surface, and thereby the function and effects available by the above-mentioned construction 11 are definitely ensured.

According to the device of the above-mentioned construction 14, when the deviation between the target yaw rate rt and the actual yaw rate r or the deviation between the target lateral acceleration Gyt and the lateral acceleration Gy is smaller than a predetermined threshold value, the behavior control of the vehicle by the behavior control device is prohibited, whereby it is definitely avoided that the behavior control of the vehicle is erroneously executed even when the estimation quantity expressing lateral sliding of the vehicle becomes high due to an external disturbance.

According to the device of the above-mentioned construction 15, when either of a first condition that the vehicle is braked during turn or a second condition that the vehicle is accelerated in understeer condition is detected, the behavior control of the vehicle by the behavior control device is expedited, whereby when the vehicle is highly liable to spin, the control of the turn behavior of the vehicle is started at the instant of occurrence of a spin, whereby the turn behavior of the vehicle is effectively controlled, whereas when the probability of the vehicle being put into spin is low, the behavior control of the vehicle by the behavior control device is made less active, whereby the probability that the behavior control is erroneously executed in the condition that the turn behavior of the vehicle is stable is decreased.

Although the present invention has been described with reference to some particular embodiments thereof, it will be apparent for those skilled in the art that the present invention is not limited to those embodiments and various other embodiments are possible within the scope of the present invention.

For example, in the above-mentioned embodiments, when the vehicle spins, the braking force of the front vehicle wheel at the outside of the turn is controlled according to the spin value SV or the modified spin value SVa so that the spin is decreased by an anti spin moment generated by the deviation between the braking force applied to the front vehicle wheel at the outside of the turn and that applied to the front vehicle wheel at the inside of the turn. However, the braking force may be controlled with respect to the front and rear vehicle wheels at the outside of the turn.

Further, in the above-mentioned second embodiment, in steps 1010–1095 the spin value SV is modified according to the level of the external disturbance of road surface, so that the amount of the behavior control is modified thereby. However, the standard value SVc for the judgement in step 1110 may be set higher as the level of the external disturbance D of road surface calculated in steps 1010–1070 is higher, corresponding to the above-mentioned construction 13, so that thereby the control of the behavior control is decreased according to the level of the external disturbance of road surface.

Further, in the above-mentioned third embodiment, spin value SV is calculated as a sum of Ksbβ corresponding to the slip angle β of the vehicle body and Ksdβd corresponding to the slip angle velocity βd of the vehicle body. However, in this embodiment the spin value may be calculated in the same manner as in the first or the second embodiment.

We claim:

1. A device for controlling behavior of a vehicle, comprising means for detecting lateral acceleration Gy of a vehicle body, means for detecting vehicle speed V, means for detecting yaw rate r of the vehicle body, means for presuming turn behavior of the vehicle based upon at least lateral slide velocity Vy of the vehicle by obtaining the lateral slide velocity Vy through integration of deviation Gy-Vr with a predetermined integration time constant, and means for controlling turn behavior of the vehicle based upon the presumed turn behavior, wherein said turn behavior presuming means includes means for varying said integration time constant such that said integration time constant is set to be smaller when a stable turn behavior of the vehicle is presumed than when an unstable turn behavior of the vehicle is presumed.

2. A device for controlling behavior of a vehicle, comprising means for detecting lateral acceleration Gy of a vehicle body, means for detecting vehicle speed V, means for detecting yaw rate r of the vehicle body, means for presuming turn behavior of the vehicle based upon at least lateral slide velocity Vy of the vehicle by obtaining the lateral slide velocity Vy through integration of deviation Gy-Vr, and means for controlling turn behavior of the vehicle based upon the presumed turn behavior, wherein said turn behavior presuming means includes means for modifying the lateral slide velocity Vy such that the lateral slide velocity Vy is decreased when the direction of the lateral slide velocity Vy is in contradiction to the direction of other parameter of the vehicle from the view point of dynamics.

3. A device for controlling behavior of a vehicle, comprising means for detecting lateral acceleration Gy of a vehicle body, means for presuming turn behavior of the vehicle based upon at least the lateral acceleration Gy, and means for controlling turn behavior of the vehicle based upon the presumed turn behavior of the vehicle, wherein said turn behavior presuming means comprises means for detecting vehicle speed V, means for detecting yaw rate r of the vehicle body, means for calculating deviation Gy-Vr, means for calculating cant compensation quantity through low pass filtering of the deviation Gy-Vr, and means for modifying the lateral acceleration Gy according to the cant compensation quantity, the turn behavior of the vehicle being presumed based upon the modified lateral acceleration Gya.

4. A device according to claim 3, wherein said behavior presuming means comprises means for calculating lateral slide velocity Vy of the vehicle through integration of deviation Gya-Vr between the modified lateral acceleration Gya and Vr, means for presuming spin of the vehicle based upon the lateral slide velocity Vy, and means for modifying the cant compensation quantity to zero when the compensation by the cant compensation quantity increases the lateral slide velocity Vy in a condition that a spin of the vehicle is presumed.

5. A device for controlling behavior of a vehicle, comprising means for detecting lateral acceleration Gy of a vehicle body, means for detecting vehicle speed V, means for detecting yaw rate r of the vehicle body, means for presuming turn behavior of the vehicle based upon at least lateral slide velocity Vy by obtaining the lateral slide velocity Vy through integration of deviation Gy-Vr, and means for controlling turn behavior of the vehicle based upon the presumed turn behavior, wherein said turn behavior presuming means includes means for modifying the lateral acceleration Gy such that change rate thereof is decreased in obtaining the lateral slide velocity Vy when the absolute value of Gy is decreasing under a condition that the absolute value of the Gy is smaller than the absolute value of Vr.

6. A device for controlling behavior of a vehicle, comprising means for detecting lateral acceleration Gy of a vehicle body, means for presuming turn behavior of the vehicle based upon at least the lateral acceleration Gy, and means for controlling turn behavior of the vehicle based upon the presumed turn behavior, wherein said turn behavior presuming means comprises means for obtaining radius of curvature of road, means for presuming bank angle of road surface based upon the radius of curvature, and means for modifying the lateral acceleration Gy according to the presumed bank angle, the turn behavior of the vehicle being presumed based upon the modified lateral acceleration.

7. A device for controlling behavior of a vehicle, comprising means for detecting lateral acceleration Gy of a vehicle body, means for detecting vehicle speed V, means for detecting yaw rate r of the vehicle body, means for detecting steering angle θ, means for calculating a first estimation quantity expressing lateral sliding of the vehicle based upon the lateral acceleration Gy, the vehicle speed V and the detected yaw rate r, means for calculating a second estimation quantity expressing deviation Δr between target yaw rate obtained from the steering angle θ and the vehicle speed V and the detected yaw rate, means for presuming turn behavior of the vehicle based upon at least said first and second estimation quantities each weighed by individual weighing factor, and means for controlling turn behavior of the vehicle based upon the presumed turn behavior, wherein said turn behavior presuming means includes means for modifying said weighing factor such that said second estimation quantity is more weighed when a stable turn behavior of the vehicle is presumed, while said first estimation quantity is more weighed when an unstable turn behavior of the vehicle is presumed.

8. A device for controlling behavior of a vehicle, comprising means for detecting lateral acceleration Gy of a vehicle body, means for detecting vehicle speed V, means for detecting actual yaw rate r of the vehicle body, means for detecting steering angle θ, means for calculating a first estimation quantity expressing lateral sliding of the vehicle based upon the lateral acceleration Gr, the vehicle speed V and the detected yaw rate r, means for calculating a second estimation quantity expressing deviation Δr between target yaw rate obtained from the steering angle θ and the vehicle speed V and the detected actual yaw rate, means for presuming spin of the vehicle based upon at least said first and second estimation quantities, and means for controlling the turn behavior of the vehicle so as to decrease the spin based upon presumed spin, wherein said means for calculating said second estimation quantity is adapted to calculate target yaw rate with a predetermined cycle and to calculate said second estimation quantity by replacing the current target yaw rate by the target yaw rate at a preceding cycle when the steering angle θ is changing toward further steering in a condition that a spin of the vehicle is presumed by the spin presuming means.

9. A device for controlling behavior of a vehicle, comprising means for detecting lateral acceleration Gy of a vehicle body, means for detecting vehicle speed V, means for detecting actual yaw rate r of the vehicle body, means for detecting steering angle θ, means for calculating a first estimation quantity expressing lateral sliding of the vehicle based upon the lateral acceleration Gy, the vehicle speed V and the detected actual yaw rate r, means for calculating a second estimation quantity expressing deviation Δr between target yaw rate obtained from the steering angle θ and the vehicle speed V and the actual yaw rate, means for presuming spin of the vehicle based upon at least said first and second estimation quantities, and means for controlling turn behavior of the vehicle so as to decrease the spin based upon the presumed spin, wherein said spin presuming means includes means for limiting said second estimation quantity not to be greater than a predetermined value when the detected actual yaw rate is smaller than the target yaw rate.

10. A device for controlling behavior of a vehicle, comprising means for detecting lateral acceleration Gy of a vehicle body, means for detecting vehicle speed V, means for detecting actual yaw rate r of the vehicle body, means for detecting steering angle θ, means for calculating a first estimation quantity expressing lateral sliding of the vehicle based upon the lateral acceleration Gy, the vehicle speed V and the detected actual yaw rate r, means for calculating a second estimation quantity expressing deviation Δr between target yaw rate obtained from the steering angle θ and the vehicle speed V and the detected actual yaw rate, means for presuming spin of the vehicle based upon at least said first and second estimation quantities, and means for controlling spin behavior of the vehicle so as to decrease the spin based upon the presumed spin, wherein said means for calculating said second estimation quantity comprises means for processing the target yaw rate obtained from the steering angle θ and the vehicle speed V to incorporate a primary delay, and means for modifying time constant of the primary delay such that the time constant is set smaller when the target yaw rate after the primary delay processing is not between the target yaw rate before the primary delay processing and the detected actual yaw rate than when the target yaw rate after the primary delay processing is between the target yaw rate before the primary delay processing and the detected actual yaw rate.

11. A device for controlling behavior of a vehicle, comprising means for detecting lateral acceleration Gy, means for detecting vehicle speed V, means for detecting actual yaw rate r of the vehicle body, means for detecting steering angle θ, means for calculating a first estimation quantity expressing lateral sliding of the vehicle based upon the lateral acceleration Gy, the vehicle speed V and the detected actual yaw rate r, means for calculating a second estimation quantity expressing deviation Δr between target yaw rate obtained from the steering angle θ and the vehicle speed V and the detected actual yaw rate, means for presuming turn behavior of the vehicle based upon a final estimation quantity based upon at least said first and second estimation quantities, and means for controlling turn behavior of the vehicle according to a control amount depending upon said final estimation quantity based upon the presumed turn behavior of the vehicle, further comprising means for detecting wheel speeds of left and right front vehicle wheels, means for detecting actual longitudinal acceleration Gx of the vehicle, means for calculating presumed yaw rate rhat of the vehicle body based upon the wheel speeds of the left and right front vehicle wheels means for calculating presumed longitudinal acceleration Gxhat based upon the wheel speeds of the left and right front vehicle wheels, means for presuming level of road disturbance based upon the deviation between the detected actual yaw rate r and the presumed yaw rate rhat and the deviation between the actual longitudinal acceleration Gx and the presumed longitudinal acceleration Gxhat, and means for modifying said control amount according to the level of road disturbance.

12. A device according to claim 11, wherein said control amount modifying means is adapted to modify said control amount by modifying said final estimation quantity according to the level of road disturbance.

13. A device according to claim 11, wherein said turn behavior control means is adapted to control the turn behavior of the vehicle according to said control amount based upon said final estimation quantity when said final estimation quantity exceeds a threshold value, and said control amount modifying means is adapted to modify said control amount by modifying said threshold value according to the level of road surface disturbance.

14. A device for controlling behavior of a vehicle, comprising means for detecting lateral acceleration Gy, means for detecting actual yaw rate r of the vehicle body, means for calculating an estimation quantity expressing lateral sliding of the vehicle based upon the lateral acceleration Gy and the detected actual yaw rate r, means for presuming spin of the vehicle body based upon at least said estimation quantity, and means for controlling spin of the vehicle so as to decrease the spin based upon the presumed spin, further comprising means for detecting vehicle speed V, means for detecting steering angle θ, means for calculating target yaw rate rt from the steering angle θ and the vehicle speed V, means for calculating target lateral acceleration Gyt from the steering angle θ and the vehicle speed V, means for judging if the deviation between the target yaw rate rt and the detected actual yaw rate r or the deviation between the target lateral acceleration Gyt and the lateral acceleration Gy is not greater than a predetermined threshold value, and means for prohibiting the behavior control by said behavior control means when said deviation with respect to yaw rate or said deviation with respect to lateral acceleration is not greater than said threshold value.

15. A device for controlling behavior of a vehicle, comprising means for detecting lateral acceleration Gy, means for detecting actual yaw rate r of the vehicle body, means for calculating an estimation quantity expressing lateral sliding of the vehicle based upon the lateral acceleration Gy and the detected actual yaw rate r, means for presuming spin of the vehicle based upon at least said estimation quantity, and means for controlling spin of the vehicle so as to decrease the spin based upon the presumed spin, further comprising means for judging a first condition that the vehicle is braked during turn, means for judging a second condition that the vehicle is accelerated in an under-steer condition, and means for expediting the behavior control by the behavior control means when said first condition or said second condition is detected.

* * * * *